US012791246B2

(12) United States Patent
Kim

(10) Patent No.: US 12,791,246 B2
(45) Date of Patent: Nov. 10, 2026

(54) ELECTRONIC DEVICE, METHOD, AND COMPUTER READABLE STORAGE MEDIUM FOR MANAGING DEFROSTING PERIOD OF REFRIGERATOR

(71) Applicant: SAMSUNG ELECTRONICS CO., LTD., Suwon-si (KR)

(72) Inventor: Su Myeon Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 260 days.

(21) Appl. No.: 18/647,993

(22) Filed: Apr. 26, 2024

(65) Prior Publication Data

US 2025/0035364 A1 Jan. 30, 2025

Related U.S. Application Data

(63) Continuation of application No. PCT/KR2024/005174, filed on Apr. 17, 2024.

(30) Foreign Application Priority Data

Jul. 28, 2023 (KR) ........................ 10-2023-0099246
Jul. 31, 2023 (KR) ........................ 10-2023-0099768
Nov. 6, 2023 (KR) ........................ 10-2023-0152221

(51) Int. Cl.
*F25D 21/00* (2006.01)
*G06N 3/08* (2023.01)

(52) U.S. Cl.
CPC ......... *F25D 21/008* (2013.01); *F25D 21/004* (2013.01); *F25D 2700/02* (2013.01); *G06N 3/08* (2013.01)

(58) Field of Classification Search
CPC .... F25D 21/008; F25D 21/004; F25D 21/006; F25D 21/02
See application file for complete search history.

(56) References Cited

U.S. PATENT DOCUMENTS 5,493,867 A * 2/1996 Szynal ................ H01H 47/002 62/155
10,871,320 B2 12/2020 Kang et al.
(Continued)

FOREIGN PATENT DOCUMENTS

CN 110715401 A * 1/2020 ............. F24F 11/64
CN 115751598 A * 3/2023
(Continued)

OTHER PUBLICATIONS

International Search Report and Written Opinion (PCT/ISA/210 and PCT/ISA/237) dated Aug. 21, 2024, issued by International Searching Authority for International Application No. PCT/KR2024/005174.

*Primary Examiner* — Lionel Nouketcha
(74) *Attorney, Agent, or Firm* — Sughrue Mion, PLLC

(57) ABSTRACT

A method performed by an electronic device, may include: receiving, from a refrigerator connected with the electronic device through a network, first information on the refrigerator, inputting, as input data, at least a portion of the first information to a prediction model for managing a defrosting period of the refrigerator, obtaining output data from the prediction model in response to the input data, predicting, based on the output data of the prediction model, an amount of frost in the refrigerator, and based on the predicted amount of the frost, transmitting second information for setting the defrosting period of the refrigerator to the refrigerator.

18 Claims, 10 Drawing Sheets

(56) References Cited

U.S. PATENT DOCUMENTS

| | | | |
|---|---|---|---|
| 10,965,489 | B2 | 3/2021 | Han et al. |
| 11,783,692 | B2 | 10/2023 | Song et al. |
| 2007/0295015 | A1 | 12/2007 | Bailey et al. |
| 2022/0341659 | A1 | 10/2022 | Jung et al. |

FOREIGN PATENT DOCUMENTS

| | | | | | |
|---|---|---|---|---|---|
| CN | 115900193 | A | | 4/2023 | |
| CN | 116447805 | A | * | 7/2023 | ............. F25D 21/02 |
| EP | 2 711 654 | A1 | | 3/2014 | |
| EP | 2 708 834 | B1 | | 1/2021 | |
| JP | 2013-72622 | A | | 4/2013 | |
| JP | 2013-108741 | A | | 6/2013 | |
| JP | 2022-97876 | A | | 7/2022 | |
| JP | 2022097876 | A | * | 7/2022 | ........... F25D 21/006 |
| JP | 7575936 | B2 | | 10/2024 | |
| KR | 10-2019-0004026 | A | | 1/2019 | |
| KR | 10-1917293 | B1 | | 1/2019 | |
| KR | 10-2019-0106944 | A | | 9/2019 | |
| KR | 10-2017087 | B1 | | 10/2019 | |
| KR | 10-2295390 | B1 | | 8/2021 | |
| KR | 20230026918 | A | * | 2/2023 | ........... F25D 21/006 |
| KR | 10-2023-0032486 | A | | 3/2023 | |
| KR | 10-2024-0008746 | A | | 1/2024 | |

* cited by examiner

ELECTRONIC DEVICE, METHOD, AND COMPUTER READABLE STORAGE MEDIUM FOR MANAGING DEFROSTING PERIOD OF REFRIGERATOR

CROSS-REFERENCE TO RELATED APPLICATIONS

This application is a continuation of International Application No. PCT/KR2024/005174 designating the United States, filed on Apr. 17, 2024, in the Korean Intellectual Property Receiving Office and claiming priority to Korean Patent Application Nos. 10-2023-0099246, filed on Jul. 28, 2023, 10-2023-0099768, filed on Jul. 31, 2023, and 10-2023-0152221, filed on Nov. 6, 2023, in the Korean Intellectual Property Office, the disclosures of each of which are incorporated by reference herein in their entireties.

BACKGROUND

1. Field

The disclosure relates to an electronic device, a method, and a computer-readable storage medium for managing a defrosting period of a refrigerator.

2. Description of Related Art

A refrigerator is a device for storing items therein at a low temperature by using an evaporator to reduce the temperature inside the refrigerator. As the temperature inside the refrigerator is maintained at the low temperature, moisture around the evaporator may be frozen on a surface of the evaporator, thereby resulting in the formation of frost. The frost is a cause of the reduced efficiency of the refrigerator. Therefore, a defrost operation is required to efficiently remove the frost from the refrigerator.

The above-described information may be provided as a related art for the purpose of helping to understand the present disclosure. No claim or determination is raised as to whether any of the above-described information may be applied as a prior art related to the present disclosure.

SUMMARY

According to an aspect of the disclosure, an electronic device may include a communication circuit, memory including one or more storage mediums storing instructions, and at least one processor including processing circuitry. The instructions, when being executed by the at least one processor individually or collectively, may cause the electronic device to: receive, via the communication circuit from a refrigerator connected with the electronic device through a network, first information on the refrigerator, input, as input data, at least a portion of the first information to a prediction model for managing a defrosting period of the refrigerator, obtain output data from the prediction model in response to the input data, predict, based on the output data of the prediction model, an amount of frost in the refrigerator, and based on the predicted amount of the frost, transmit, via the communication circuit to the refrigerator, second information for setting the defrosting period of the refrigerator.

According to an aspect of the disclosure, a method performed by an electronic device, may include: receiving, from a refrigerator connected with the electronic device through a network, first information on the refrigerator, inputting, as input data, at least a portion of the first information to a prediction model for managing a defrosting period of the refrigerator, obtaining output data from the prediction model in response to the input data, predicting, based on the output data of the prediction model, an amount of frost in the refrigerator, and based on the predicted amount of the frost, transmitting second information for setting the defrosting period of the refrigerator to the refrigerator.

According to an aspect of the disclosure, a non-transitory computer readable storage medium may store one or more programs. The one or more programs including instructions, which, when being executed by at least one processor of an electronic device, may cause the electronic device to: receive, from a refrigerator connected with the electronic device through a network, first information on the refrigerator, input, as input data, at least a portion of the first information to a prediction model for managing a defrosting period of the refrigerator, obtain output data from the prediction model in response to the input data, predict, based on the output data of the prediction model, an amount of frost in the refrigerator, and based on the predicted amount of the frost, transmit second information for setting the defrosting period of the refrigerator to the refrigerator.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
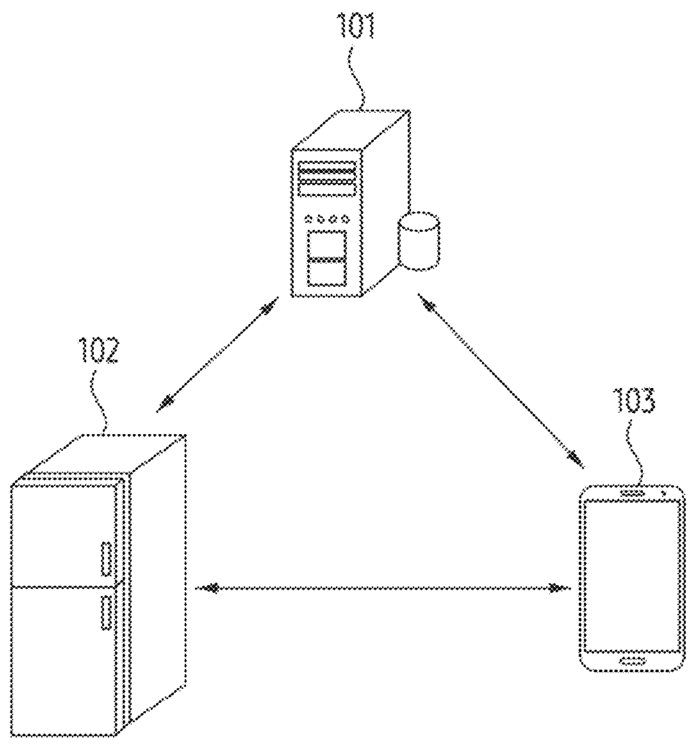
FIG. 1 illustrates an example of an environment including an electronic device, a refrigerator, and an external electronic device, according to one or more embodiments.

The following descriptions relate to an electronic device and a method of controlling the electronic device. For example, an electronic device and a method for setting a defrosting period of a refrigerator using artificial intelligence (AI (or AI model)) will be described.

Hereinafter, embodiments of the present disclosure will be described in detail with reference to drawings so that those having ordinary knowledge in the art to which the present disclosure belongs may easily implement it. However, the present disclosure may be implemented in various different forms and is not limited to the embodiments described herein. In relation to the description of the drawings, identical or similar reference numerals may be used for identical or similar components. In addition, in the drawings and related descriptions, descriptions of well-known features and configurations may be omitted for clarity and brevity.

Terms such as 'front surface', 'rear surface', 'top surface', 'lower surface', 'side surface', 'left side', 'right side', 'upper side', and 'lower side' used in the present disclosure are defined based on drawings, and a shape and a position of each component are not limited by these terms.

Hereinafter, terms such as "include" or "have" of the present disclosure merely are intended to designate the existence of features, numbers, steps, operations, components, part, or a combination thereof described in the present disclosure, and possibility of the existence or addition of one or more other features, numbers, steps, operations, components, parts, or a combination thereof is not excluded in advance.

When a component is "connected," "coupled," "supported," or "contacted" with another component, this includes not only when the components are directly connected, coupled, supported, or contacted with each other, but also indirectly connected, combined, supported, or contacted through a third component.

When a component is located "on" another component, this includes not only when the component is in contact with the other component, but also still another component exists between the two components.

A refrigerator according to one or more embodiments may include a main body.

The "main body" may include an inner shape, an outer shape disposed outside the inner shape, and an insulation material provided between the inner shape and the outer shape.

The inner shape may include at least one of a case, a plate, a panel, or a liner forming a storage compartment. The inner shape may be formed as a single body or may be formed by assembling a plurality of plates. The outer shape may form the appearance of the main body, and may be coupled to the outside of the inner shape so that the insulation material is disposed between the inner shape and the outer shape.

The insulation material may insulate the inside and the outside of the storage compartment so that a temperature inside the storage compartment may be maintained at a set appropriate temperature without being affected by an external environment of the storage compartment. According to one or more embodiments, the insulation material may include a foam insulation material. The foam insulation material may be molded by injecting and foaming urethane foam mixed with polyurethane and foaming agent between the inner shape and the outer shape.

According to one or more embodiments, the insulation material may include a vacuum insulation material in addition to the foam insulation material, or the insulation material may be formed of only the vacuum insulation material instead of the foam insulation material. The vacuum insulation material may include a core material and an outer shell material that accommodates the core material and seals the inside to a vacuum or pressure close to vacuum. However, the insulation material is not limited to the foam insulation material or vacuum insulation material described above and may include any suitable insulation materials known to one of ordinary skill in the art.

The storage compartment may include a space defined by the inner shape. The storage compartment may further include an inner shape that defines a space corresponding to the storage compartment. Various items, such as food, medicine, and cosmetics, may be stored in the storage compartment, and the storage compartment may be formed so that at least one side is open for loading and unloading items.

The refrigerator may include one or more storage compartments. When two or more storage compartments are formed in the refrigerator, each storage compartment may have a different use and be maintained at a different temperature. To this end, each storage compartment may be partitioned from each other by a partition wall including an insulation material.

The storage compartment may be maintained in an appropriate temperature range according to the use, and may include a "fridge", a "freezer", or an "alternating temperature room" classified according to the use and/or temperature range thereof. The fridge may be maintained at a temperature appropriate for refrigerating products, and the freezer may be maintained at a temperature appropriate for freezing products. As understood by one of ordinary skill in the art, the term "refrigerating" may mean cold cooling of products without freezing the products, and as an example, the fridge may be maintained in a range of 0 degrees Celsius to 7 degrees Celsius. As understood by one of ordinary skill in the art, the term freezing "freezing" may mean glaciating the products or cooling the products to remain frozen. For example, the freezer may be maintained in a range of −20 degrees Celsius to −1 degrees Celsius. The alternating temperature room may be used as any one of the fridge or the freezer, according to a user's selection or regardless of the selection.

In addition to terms of "fridge," "freezer," and "alternating temperature room," the storage compartment may be referred to by various terms such as "vegetable room," "fresh room," "cooling room," and "ice-making room." Terms such as "fridge," "freezer," and "alternating temperature room" used below should be understood as encompassing a storage compartment with corresponding a use and a temperature range, respectively.

According to one or more embodiments, the refrigerator may include at least one door configured to open and close an open side of the storage compartment. Doors may be provided to open and close each of one or more storage compartments, or a single door may be provided to open and close a plurality of storage compartments. The door may be rotatably or slidably installed on a front surface of the main body.

The door may be configured to seal the storage compartment when the door is closed. Like the main body, the door may include an insulation material, in order to insulate the storage compartment when the door is closed.

According to one or more embodiments, the door may include a door outer plate forming a front surface of the door, a door inner plate forming a rear surface of the door and facing the storage compartment, an upper cap, a lower cap, and a door insulation material provided inside thereof.

A gasket may be provided on a border of the door inner plate for sealing the storage compartment by being in close contact with the front surface of the main body when the door is closed. The door inner plate may include a dyke protruding rearward so that a door basket capable of storing products is mounted.

According to one or more embodiments, the door may include a door body and a front panel detachably coupled to a front side of the door body and forming the front surface of the door. The door body may include a door outer plate forming a front surface of the door body, a door inner plate forming a rear surface of the door body and facing the storage compartment, an upper cap, a lower cap, and a door insulation material provided inside thereof.

The refrigerator may be classified into French Door Type, Side-by-side Type, Bottom Mounted Freezer (BMF), Top Mounted Freezer (TMF), or one-door refrigerator, according to an arrangement of the door and the storage compartment.

According to one or more embodiments, the refrigerator may include a cold air supply device configured to supply cold air to the storage compartment.

The cold air supply device may include a machine, an apparatus, an electronic device, and/or a system combining them, capable of generating cold air and cooling the storage compartment by guiding the cold air.

According to one or more embodiments, the cold air supply device may generate cold air through a refrigeration cycle including processes of compression, condensation, expansion, and evaporation of the refrigerant. To this end, the cold air supply device may include a refrigeration cycle device having a compressor, a condenser, an expansion device, and an evaporator capable of driving the refrigeration cycle. According to one or more embodiments, the cold air supply device may include a semiconductor such as a thermoelectric element. The thermoelectric element may cool the storage compartment through heat generation and cooling by the Peltier effect.

According to one or more embodiments, the refrigerator may include a machine room so that at least a part of components belonging to the cold air supply device are disposed.

The machine room may be provided to be partitioned and insulated from the storage compartment to prevent heat generated from a component disposed in the machine room from being transferred to the storage compartment. The inside of the machine room may be configured to communicate with the outside of the main body, in order to dissipate heat form the component disposed within the machine room.

According to one or more embodiments, the refrigerator may include a dispenser provided on the door to provide water and/or ice. The dispenser may be provided on the door so that a user may access it without opening the door.

According to one or more embodiments, the refrigerator may include an ice making device provided to generate ice. The ice making device may include an ice making tray for storing water, an ice separating device for separating ice from the ice making tray, and an ice bucket for storing ice generated in the ice making tray.

According to one or more embodiments, the refrigerator may include a control unit for controlling the refrigerator.

The control unit may include a memory for storing or memorizing program and/or data for controlling the refrigerator, and a processor outputting a control signal for controlling the cold air supply device according to the program and/or the data memorized in the memory.

The memory stores or records various information, data, instructions, and programs necessary for operations of the refrigerator. The memory may store temporary data generated while generating a control signal for controlling components included in the refrigerator. The memory may include at least one of a volatile memory and a nonvolatile memory, or a combination thereof.

According to one or more embodiments, the processor controls the overall operation of the refrigerator. The processor may control the components of the refrigerator by executing the program stored in the memory. The processor may include a separate NPU that performs the operation of the AI model. In addition, the processor may include a central processing unit (CPU), a graphic processing unit (GPU), and the like. The processor may generate a control signal for controlling the operation of the cold air supply device. For example, the processor may receive temperature information of the storage compartment from a temperature sensor, and generate a cooling control signal for controlling the operation of the cold air supply device based on the temperature information of the storage compartment.

In addition, the processor may process a user input of a user interface according to the program and/or the data stored and/or memorized in the memory, and control an operation of the user interface. The user interface may be provided using an input interface and an output interface. The processor may receive a user input from the user interface. In addition, the processor may transmit a display control signal and image data for displaying an image on the user interface in response to a user input, to the user interface.

The processor and the memory may be provided integrally or separately. The processor may include one or more processors. For example, the processor may include a main processor and at least one sub-processor. The memory may include one or more memories.

According to one or more embodiments, the refrigerator may include a processor and a memory for controlling all components included in the refrigerator, and may include a plurality of processors and a plurality of memories for individually controlling components of the refrigerator. For example, the refrigerator may include a processor and a memory for controlling an operation of the cold air supply device according to output of the temperature sensor. In addition, the refrigerator may separately include a processor and a memory for controlling an operation of the user interface according to the user input.

A communication module may communicate with an external device such as a server, a mobile device, and another home appliance through a peripheral access point (AP). The AP may connect a local area network (LAN) to which a refrigerator or a user device is connected to a wide area network (WAN) to which a server is connected. The refrigerator or the user device may be connected to the server through the WAN.

The input interface may include a key, a touch screen, a microphone, and the like. The input interface may receive a user input and transmit the user input to the processor.

The output interface may include a display, a speaker, and the like. The output interface may output various notifications, messages, information, and the like generated by the processor.

A function related to artificial intelligence according to the present disclosure are operated through a processor and a memory. The processor may be configure with one or more processors. At this time, the one or more processors may be a general-purpose processor such as CPU, AP, or Digital Signal Processor (DSP), a graphic dedicated processor such as GPU or Vision Processing Unit (VPU), or an AI dedicated processor such as NPU. The one or more processors may control to process input data according to a predefined operation rule or AI model stored in the memory. In one or more examples, when the one or more processors are the AI dedicated processor, the AI dedicated processor may be designed with a hardware structure specialized for processing a specific AI model.

In one or more examples, a predefined operation rule of an AI model may be created through learning. In one or more examples, being created through learning means that an AI model is learned using a plurality of learning data by a learning algorithm so that a predefined operation rule or AI model set to perform a desired characteristic (or purpose) is created. This learning may be performed by the device itself on which the AI according to the present disclosure is performed, or may be performed through a separate server and/or system. Examples of the learning algorithm include supervised learning, unsupervised learning, semi-supervised learning, or reinforcement learning, but are not limited to the above examples.

In one or more examples, the AI model may be configured with a plurality of neural network layers. Each of the plurality of neural network layers has a plurality of weight values, and a neural network operation is performed through calculation between a calculation result of the previous layer and the plurality of weight values. The plurality of weight values of the plurality of neural network layers may be optimized by a learning result of the AI model. For example, the plurality of weight values may be updated so that a loss value or a cost value obtained from the AI model during the learning process is reduced or minimized. Artificial neural network may include a Deep Neural Network (DNN) such as Convolutional Neural Network (CNN), Deep Neural Network (DNN), Recurrent Neural Network (RNN), Restricted Boltzmann Machine (RBM), Deep Belief Network (DBN), Bidirectional Recurrent Deep Neural Network (BRDNN), or Deep Q-Networks. As understood by one of ordinary skill in the art, the embodiments are not limited to the examples described above, and the artificial neural network may include any suitable neural network known to one of ordinary skill in the art.

In a method for setting a defrosting period of a refrigerator of an electronic device according to the present disclosure, a method for recognizing a user's voice and interpreting intention to set the defrosting period of the refrigerator may include receiving a voice signal, which may be an analog signal, and converting speech parts of the voice signal into text readable by a computer using an Automatic Speech Recognition (ASR) model. The user's speech intention may be obtained by interpreting the converted text using a Natural Language Understanding (NLU) model. In one or more examples, the ASR model or the NLU model may be an AI model. The AI model may be processed by an AI dedicated processor designed with a hardware structure specialized for processing the AI model. The AI model may be created through learning. In one or more examples, being created through learning means that a AI model is learned using a plurality of learning data (e.g., training data) by a learning algorithm, so that a predefined operation rule or AI model set to perform the desired characteristics (or purpose) is created. The AI model may be configured with a plurality of neural network layers. In one or more examples, each of the plurality of neural network layers has a plurality of weight values, and a neural network operation is performed through calculation between a calculation result of the previous layer and the plurality of weight values.

Linguistic understanding is a technology for recognizing and applying/processing human language/characters, and includes Natural Language Processing, Machine Translation, Dialog System, Question Answering, Speech Recognition/Synthesis, and the like.

In the method for setting the defrosting period of the refrigerator of the electronic device according to the present disclosure, the method for setting the defrosting period of the refrigerator may obtain an image or output data in the image by using image data as input data of the AI model. The AI model may be created through learning. In one or more examples, being created through learning means that the AI model is learned using the plurality of learning data by the learning algorithm so that the predefined operation rule or the AI model set to perform the desired characteristic (or purpose) is created. The AI model may be configured with the plurality of neural network layers. Each of the plurality of neural network layers has a plurality of weight values, and a neural network operation is performed through calculation between a calculation result of the previous layer and the plurality of weight values.

Visual understanding is a technology for recognizing and processing an object such as human vision, and includes Object Recognition, Object Tracking, Image Retrieval, Human Recognition, Scene Recognition, 3D Reconstruction/Localization, Image Enhancement, and the like.

In the method for setting the defrosting period of the refrigerator of the electronic device according to the present disclosure, a method for inferring or predicting the defrosting period of the refrigerator may use the AI model in order to recommend/execute the defrosting period of the refrigerator using defrosting related information. The processor of the electronic device may convert data into a form suitable for use as an input of the AI model, by performing a preprocessing process on the data. The AI model may be created through learning. In one or more examples, being created through learning means that the AI model is learned using the plurality of learning data by the learning algorithm, so that the predefined operation rule or the AI model set to perform the desired characteristic (or purpose) is created. The AI model may be configured with the plurality of neural network layers. Each of the plurality of neural network layers has a plurality of weight values, and a neural network operation is performed through calculation between a calculation result of the previous layer and the plurality of weight values.

Inference predicting is a technology for logically inferring and predicting by judging information, and includes Knowledge based Reasoning, Optimization Prediction, Preference-based Planning, Recommendation, and the like.

Hereinafter, the electronic device and the method for setting the defrosting period of the refrigerator will be described in detail with reference to accompanying drawings.

FIG. 1 illustrates an example of an environment including an electronic device, a refrigerator, and an external electronic device, according to one or more embodiments.

Referring to FIG. 1, an electronic device 101 may establish connection with a refrigerator 102 and an external electronic device 103. The electronic device 101 may establish a connection with the refrigerator 102. The electronic device 101 may establish a connection with the external electronic device 103.

According to one or more embodiments, the electronic device 101 may be used to manage a plurality of refrigerators including the refrigerator 102. Each of the plurality of refrigerators may be used (or owned) by different users. For example, the electronic device 101 may be referred to as a server.

According to one or more embodiments, the electronic device 101 may be connected to the refrigerator 102 and/or the external electronic device 103 through a network. For example, the network may be configured based on at least one of various radio access technologies (RATs) capable of being supported in the electronic device 101. A non-limiting example of the various radio access technologies (RATs) capable of being supported in the electronic device 101 will be described later in FIG. 2*a*.

According to one or more embodiments, the electronic device 101 may be used to manage the refrigerator 102. FIG. 1 illustrates that the electronic device 101 is distinguished from the refrigerator 102, but it is not limited thereto. At least some or all of the electronic device 101 (or components of the electronic device 101) may be included in the refrigerator 102.

According to one or more embodiments, the electronic device 101 may receive information (e.g., first information) about the refrigerator 102 from the refrigerator 102. The electronic device 101 may identify a state of the refrigerator 102 based on the information about the refrigerator 102. The electronic device 101 may transmit information for indicating a state of the refrigerator 102 to the external electronic device 103. The external electronic device 103 may display the state of the refrigerator 102 through a display of the external electronic device 103, based on the information for indicating the state of the refrigerator 102. The external electronic device 103 may provide information on the state of the refrigerator 102 to a user, by displaying the state of the refrigerator 102 through the display.

According to one or more embodiments, the refrigerator 102 may generate cold air by repeating compression process, condensation process, expansion process, and evaporation process of refrigerant, and maintain a temperature inside the refrigerator 102 to be low. The compressed liquid refrigerant may pass through an evaporator of the refrigerator 102. The refrigerant may vaporize, according to a low pressure at an outlet side of the evaporator. Since thermal energy around the evaporator is used to vaporize the refrigerant according to the vaporization of the refrigerant, a temperature inside the refrigerator 102 may be lowered. Based on the decrease in the temperature of the evaporator, moisture around the evaporator may freeze on a surface of the evaporator. Accordingly, frost may be formed on the surface of the evaporator. However, according to a surrounding environment (e.g., external temperature, internal temperature, and humidity) of the refrigerator 102, an amount of frost formed on the surface of the evaporator and speed at which frost is formed may be different.

The formed frost may be removed according to a defrosting algorithm operating in the refrigerator 102. The defrosting operation may be performed in the refrigerator 102 based on a designated period (or designated time interval). In one or more examples, when a period for performing the defrosting operation is short (e.g., less than or equal to 1 hour), the performance of the refrigerator 102 may deteriorate and power consumption may increase. In one or more examples, when the period for performing the defrosting operation is long (e.g., greater than 1 hour), since an amount of frost is formed larger than frost removed by the defrosting operation, cooling performance and energy efficiency may be lowered due to the frost. In addition, thickened frost may cause a failure of the evaporator and a fan around the evaporator.

According to one or more embodiments, the electronic device 101 may set a period for removing the frost from the refrigerator 102. For example, the electronic device 101 may predict an amount of frost in the refrigerator 102, based on information about the refrigerator 102. The electronic device 101 may predict the amount of frost in the refrigerator 102 using a prediction model. The prediction model may be an AI model. The predicted amount of frost in the refrigerator 102 may correspond to an estimation of a current amount of the frost in refrigerator 102 or an estimation of a future amount frost in the refrigerator 102. For example, if information about the refrigerator 102 is received at 12:00 pm, the predicted amount of frost in the refrigerator 102 may be an estimation of the frost in the refrigerator 102 at 12:00 pm. In another example, if information about the refrigerator 102 is received at 12:00 pm, the predicted amount of frost in the refrigerator 102 may be an estimation of the frost in the refrigerator 102 at a future time (e.g., 30 minutes from the time the information about the refrigerator 102 is received).

The electronic device 101 may transmit information for setting a defrosting period to the refrigerator 102, based on the predicted amount of frost. The refrigerator 102 may change or maintain the defrosting period of the refrigerator 102, based on the information for setting the defrosting period.

A configuration of the electronic device 101 for performing the above-described operation will be described in FIGS. 2A and 2B.

Figure 2A:
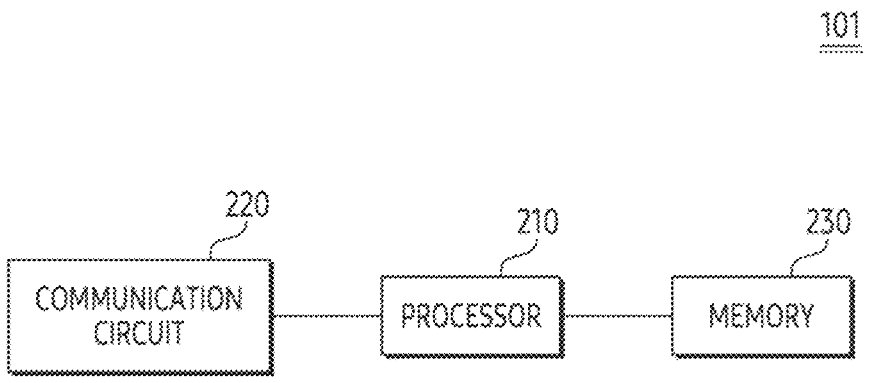
FIG. 2A is a simplified block diagram of an electronic device, according to one or more embodiments.

FIG. 2A is a simplified block diagram of an electronic device, according to one or more embodiments.

Referring to FIG. 2A, the electronic device 101 may include a processor 210, a communication circuit 220, and/or a memory 230. According to one or more embodiments, the electronic device 101 may include at least one of the processor 210, the communication circuit 220, and the memory 230. For example, at least a part of the processor 210, the communication circuit 220, and the memory 230 may be omitted according to one or more embodiments. The electronic device 101 may correspond to an electronic device 901 or a server 908 illustrated in FIG. 9. For example, the electronic device 101 may include at least a part of components of the electronic device 901 illustrated in FIG. 9.

According to one or more embodiments, the electronic device 101 may include the processor 210. The processor 210 may be operably coupled with or connected with the communication circuit 220 and the memory 230. The processor 210 being operably coupled with or connected with the communication circuit 220 and the memory 230 may mean that the processor 210 may control the communication circuit 220 and the memory 230. For example, the communication circuit 220 and the memory 230 may be controlled by the processor 210.

Although illustrated based on different blocks, embodiments are not limited thereto, and a part (e.g., at least a part of the processor 210, the communication circuit 220, and the memory 230) of hardware of FIG. 2A may be included in a single integrated circuit such as a system on a chip (SoC).

According to one or more embodiments, the processor 210 may include a hardware component for processing data based on one or more instructions. For example, the hardware component for processing data may include an arithmetic and logic unit (ALU), a field programmable gate array (FPGA), and/or a central processing unit (CPU). For example, the processor 210 may correspond to a processor 920 of FIG. 9.

For example, the processor 210 may include an application processor, a supplementary processor (e.g., a sensor hub, a microcontroller unit (MCU)), a central processor unit (CPU), a natural processing unit (NPU), a graphic processing unit (GPU), and/or a processor for IoT (e.g., a processor integrated with a communication module).

According to one or more embodiments, the electronic device 101 may include the communication circuit 220. For example, the communication circuit 220 may be used for various radio access technologies (RATs). For example, the communication circuit 220 may be used to perform Bluetooth communication, wireless local area network (WLAN) communication, Zigbee communication, near field communication (NFC), ultra-wide band (UWB) communication, radio-frequency identification (RFID) communication, or ANT+ communication. For example, the communication circuit 220 may be used to perform cellular communication (e.g., fourth generation (4G) communication, fifth generation (5G) communication, sixth generation (6G) communication, or narrow band IoT (NB-IoT)). For example, the processor 210 may establish a connection with the external electronic device 103 through the communication circuit 220. For example, the communication circuit 220 may correspond to at least a part of a communication module 990 of FIG. 9.

According to one or more embodiments, the electronic device 101 may include the memory 230. The memory 230 may be used to store information or data. For example, the memory 230 may be used to store data obtained from a user. For example, the memory 230 may be a volatile memory unit or units. For example, the memory 230 may be a non-volatile memory unit or units. For another example, the memory 230 may be another type of computer-readable medium, such as a magnetic or optical disk. For example, the memory 230 may correspond to a memory 930 of FIG. 9.

For example, the memory 230 may store data obtained based on an operation performed at the processor 210. For example, the memory 230 may store information on the refrigerator 102. The memory 230 may store information for setting the defrosting period of the refrigerator 102. For example, the memory 230 may store information on a user of the refrigerator 102.

Figure 2B:
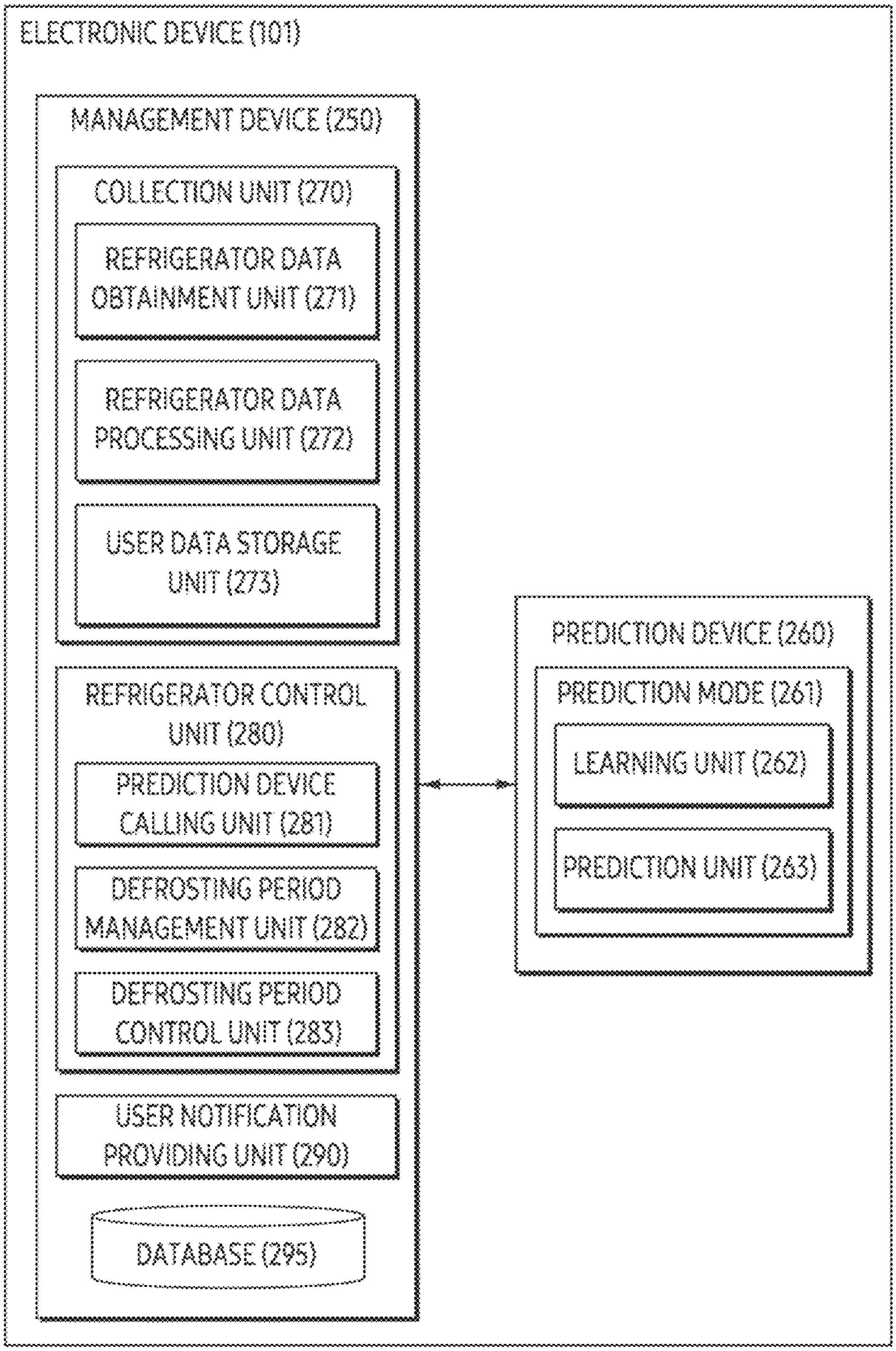
FIG. 2B illustrates components of an electronic device, according to one or more embodiments.

FIG. 2B illustrates components of an electronic device, according to one or more embodiments.

The components illustrated in FIG. 2B may process at least one function or operation. The components illustrated in FIG. 2B may be implemented by hardware or software, or a combination of hardware and software. According to one or more embodiments, at least a part of the components illustrated in FIG. 2B may be omitted. According to one or more embodiments, at least a part of the components illustrated in FIG. 2B may be included in the refrigerator 102 or another electronic device and operates.

Terms such as '. . . part' and '. . . er' (e.g., "processor") described below refer to a unit for processing at least one function or operation, which may be implemented by hardware or software, or a combination of hardware and software.

Referring to FIG. 2B, the electronic device 101 may include a management device 250 and a prediction device 260. For example, the management device 250 and the prediction device 260 may be logically separated in the electronic device 101. According to one or more embodiments, the management device 250 and the prediction device 260 may be physically separated from each other. The management device 250 and the prediction device 260 may be controlled by the processor 210.

For example, the management device 250 may be used to obtain and store information (or data) on the refrigerator 102. The prediction device 260 may be used to predict amount of frost in the refrigerator 102.

According to one or more embodiments, the management device 250 may process (or preprocess) data about the refrigerator 102, and may store the processed data. For example, information related to defrosting performed in the refrigerator 102 may be summarized and stored. Based on characteristics of the data about the refrigerator 102, the information related to defrosting may be summarized. As an example, information on rotation of a fan of the refrigerator 102 may be stored based on an average value (or a weighted average value). For example, the number of times a door of the refrigerator 102 is opened and closed and/or amount of power consumption may be stored based on an accumulated value during the designated time.

For example, the management device 250 may manage (or set) the defrosting period of the refrigerator 102. For example, the management device 250 may provide information on the predicted amount of frost to the refrigerator 102. For example, the management device 250 may transmit information on a state of the refrigerator 102 to the external electronic device 103. The management device 250 may provide information on the state of the refrigerator 102 to the user of the refrigerator 102 through the external electronic device 103, by transmitting information on the state of the refrigerator 102 to the external electronic device 103.

For example, the management device 250 may include a data collection unit 270, a refrigerator control unit 280, a user notification providing unit 290, and a database 295.

In one or more examples, the data collection unit 270 may include a refrigerator data obtainment unit 271, a refrigerator data processing unit 272, and/or a user data storage unit 273. The refrigerator data obtainment unit 271 may collect data (or information) about the refrigerator 102. The refrigerator data processing unit 272 may process (or handle) data (or information) about the refrigerator 102 and store the processed data in the database 295 (or the memory 230). The data about the refrigerator 102 may include data about the evaporator of the refrigerator 102 and data about an external environment of the refrigerator 102. For example, information about the refrigerator 102 received from the refrigerator 102 may be in a compressed state. The refrigerator data processing unit 272 may store the processed data in the database 295 (or the memory 230) by processing the compressed data.

In one or more examples, the user data storage unit 273 may obtain information on a user of the refrigerator 102 and/or the external electronic device 103 owned by the user, and store the obtained information in the database 275 (or the memory 230). For example, the data stored through the user data storage unit 273 may include information (e.g., product information of the refrigerator 102) about the refrigerator 102 inputted by the user and information about whether to agree a notification about the refrigerator 102.

In one or more examples, the refrigerator control unit 280 may include a prediction device calling unit 281, a defrosting period management unit 282, and/or a defrosting period control unit 283. The prediction device calling unit 281 may be used to drive the prediction device 260. The prediction device calling unit 281 may be used to provide information about the refrigerator 102 to the prediction device 260. The prediction device calling unit 281 may be used to periodically drive the prediction device 260. The defrosting period management unit 282 may be used to manage the defrosting period of the refrigerator 102. The defrosting period management unit 282 may store information about a change in the defrosting period of the refrigerator 102 in the database 295 (or the memory 230). The defrosting period management unit 282 may store information on the amount of frost in the refrigerator 102 received from the prediction device 260. The defrosting period control unit 283 may be used to set (or change) the defrosting period of the refrigerator 102. The defrosting period control unit 283 may transmit information (or second information) for setting a defrosting period to the refrigerator 102.

In one or more examples, the user notification providing unit 290 may provide at least one of a set defrosting period, a state of the refrigerator 102, and/or a defrosting history to the user of the refrigerator 102 through the external electronic device 103 (or the refrigerator 102).

In one or more examples, the database 295 may be used to store information about the refrigerator 102 and/or information about the user. The database 295 may be configured based on at least a portion of the memory 230.

According to one or more embodiments, the prediction device 260 may be used to predict the amount of frost formed in the evaporator of the refrigerator 102. For example, the amount of frost formed in the evaporator may be represented as a defrosting time (or a time required for defrosting). When it is predicted that the amount of frost formed in the evaporator is to be larger (e.g., larger than a defrosting threshold), it may be determined that the defrosting time should be increased. When it is predicted that the amount of frost formed in the evaporator is to be smaller (e.g., smaller than or equal to a defrosting threshold), it may be determined that the defrosting time should be decreased. In order to quantify the amount of frost formed in the evaporator, the prediction device 260 may predict the amount of frost formed in the evaporator as the defrosting time.

For example, the prediction device 260 may include the prediction model 261. The prediction model 261 may include a learning unit 262 and a prediction unit 263. The prediction model 261 may be configured based on an AI model such as a neural network. The prediction model 261 may learn information about the refrigerator 102 through the learning unit 262. The prediction model 261 may predict the amount of frost formed in the refrigerator 102 through the prediction unit 263. For example, at least a portion of the information about the refrigerator 102 may be set as input data of the prediction model 261. The amount of frost formed in the refrigerator 102 may be set as output data of the prediction model 261. The amount of frost formed in the refrigerator 102 may be represented as defrosting time. For example, the defrosting time may be set as the output data of the prediction model 261.

For example, the prediction model 261 may be configured based on at least one of a linear regression model, decision-tree model, multi-layer-perception (MLP), convolution network (CVNet), and/or long short term memory (LSTM).

FIG. 2B illustrates that the electronic device 101 includes the management device 250 and the prediction device 260. However, the embodiments are not limited to these configurations. For example, the management device 250 and the prediction device 260 may be configured as different electronic devices. For example, the management device 250 may be referred to as a first electronic device (or a first server, a management server). For example, the prediction device 260 may be referred to as a second electronic device (or a second server, a predict server).

According to one or more embodiments, at least one or more or all of components of the management device 250 may be included in the prediction device 260. According to one or more embodiments, at least some or all of components of the prediction device 260 may be included in the management device 250.

According to one or more embodiments, at least a part of components (e.g., the management device 250 and the prediction device 260) included in the electronic device 101 may be included in the refrigerator 102.

Figure 3:
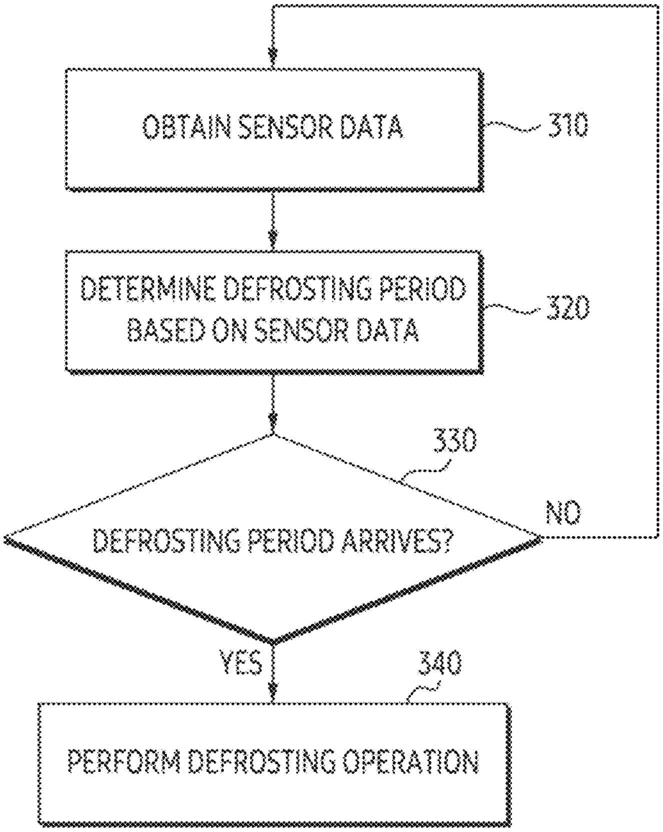
FIG. 3 is a flowchart illustrating a defrosting operation of a refrigerator, according to one or more embodiments.

FIG. 3 is a flowchart illustrating a defrosting operation of a refrigerator, according to one or more embodiments. In the following embodiment, each operation may be performed sequentially, but is not necessarily performed sequentially. For example, the sequence of each operation may be changed, and at least two operations may be performed in parallel.

Referring to FIG. 3, operations 310 to 340 may correspond to defrosting operations performed based on a defrosting algorithm stored in the refrigerator 102.

In operation 310, the refrigerator 102 (or a control unit or a processor of the refrigerator 102) may obtain sensor data. For example, the refrigerator 102 may obtain information on a temperature outside the refrigerator 102, information on the number of door opening and closing times of the refrigerator 102, and/or information on a time when a door of the refrigerator 102 is opened. The refrigerator 102 may obtain information on the temperature of an environment outside the refrigerator 102, information on the number of door opening and closing times of the refrigerator 102, and/or information on the time when the door of the refrigerator 102 is opened, during a designated time (e.g., 1 hour). The information about the refrigerator may be received at predetermined intervals (e.g., every hour, every other hour, etc.)

In operation 320, the refrigerator 102 may determine a defrosting period based on the sensor data. For example, the refrigerator 102 may determine the defrosting period based on at least one of the information on the temperature outside the refrigerator 102, the information on the number of door opening and closing times of the refrigerator 102, and/or the information on the time when the door of the refrigerator 102 is opened.

According to one or more embodiments, the refrigerator 102 may set the defrosting period to be short under a condition in which a large amount of frost is formed. The refrigerator 102 may set the defrosting period to be long under a condition in which a small amount of frost is formed.

For example, the refrigerator 102 may set the defrosting period as shown in Table 1.

TABLE 1

| The number of door opening and closing of refrigerator, and opening time | defrosting period | | |
|---|---|---|---|
| | External temperature greater than or equal to 40 degrees | External temperature greater than or equal to 18 degrees and less than 40 degrees | External temperature less than 18 degrees |
| Door opening and closing less than or equal to 3 times or Cumulative opening time of refrigerator door less than 40 seconds | 30 H(hour) | 80 H(hour) | 100 H(hour) |
| Door opening and closing greater than or equal to 4 times, and less than 20 times or Cumulative opening time of refrigerator door greater than or equal to 40 seconds, and less than 300 seconds | 15 H(hour) | 50 H(hour) | 60 H(hour) |
| Door opening and closing greater than or equal to 21 times or Cumulative opening time of refrigerator door greater than or equal to 300 seconds | 12 H(hour) | 30 H(hour) | 40 H(hour) |

Referring to Table 1, when the door of the refrigerator 102 is opened for a specific time (e.g., 12 seconds) and then closed, the refrigerator 102 may increment the number of opening and closing times by one. For example, when the number of door opening and closing times of the refrigerator 102 is less than or equal to 3 times for a designated time (e.g., 1 hour), or a cumulative opening time of the door of the refrigerator 102 is less than 40 seconds, and the external temperature is greater than or equal to 40 degrees, the refrigerator 102 may set the defrosting period to 30 hours. For example, when the number of door opening and closing times of the refrigerator 102 is less than or equal to 3 times for a designated time (e.g., 1 hour), or a cumulative opening time of the door of the refrigerator 102 is less than 40 seconds, and the external temperature is greater than or equal to 40 degrees, the refrigerator may perform a defrosting operation every 30 hours.

In operation 330, the refrigerator 102 may identify (or determine) whether the defrosting period arrives (e.g., time to perform defrosting). For example, the refrigerator 102 may identify whether the defrosting period arrives, based on determining the defrosting period.

For example, when the defrosting period is determined to be 12 hours, the refrigerator 102 may identify whether 12 hours have passed since the last defrosting operation was performed.

According to one or more embodiments, when the defrosting period has not arrived (e.g., it is not time to perform defrosting), the refrigerator 102 may perform operation 310. The refrigerator 102 may monitor sensor data before the defrosting period arrives. The refrigerator 102 may change (or update) the defrosting period based on the monitored sensor data before the defrosting period arrives.

In operation 340, when the defrosting period arrives (e.g., time to perform defrosting), the refrigerator 102 may perform the defrosting operation. The refrigerator 102 may perform the defrosting operation by melting frost around the evaporator of the refrigerator 102 by increasing a temperature around the evaporator. The refrigerator 102 may cease the defrosting operation, based on identifying that the temperature around the evaporator is a designated temperature. The refrigerator 102 may identify or determine that defrosting has been completed based on identifying or determining that the temperature around the evaporator is the designated temperature. The refrigerator 102 may cease the defrosting operation based on identifying or determining that defrosting is completed.

Referring to operations 310 to 340 described above, the defrosting period may be determined through a control unit (or processor) included in the refrigerator 102. However, due to limitations (e.g., lack of memory and/or lack of processing capacity) in the performance of the control unit included in the refrigerator 102, the defrosting period may not be properly determined based on various information about the refrigerator 102.

Therefore, the electronic device 101 including a prediction model based on AI model may advantageously set (or determine or identify) the defrosting period of the refrigerator 102 based on various pieces of information about the refrigerator 102. Hereinafter, an operation of the electronic device 101 for setting the defrosting period of the refrigerator 102 will be described in FIG. 4.

Figure 4:
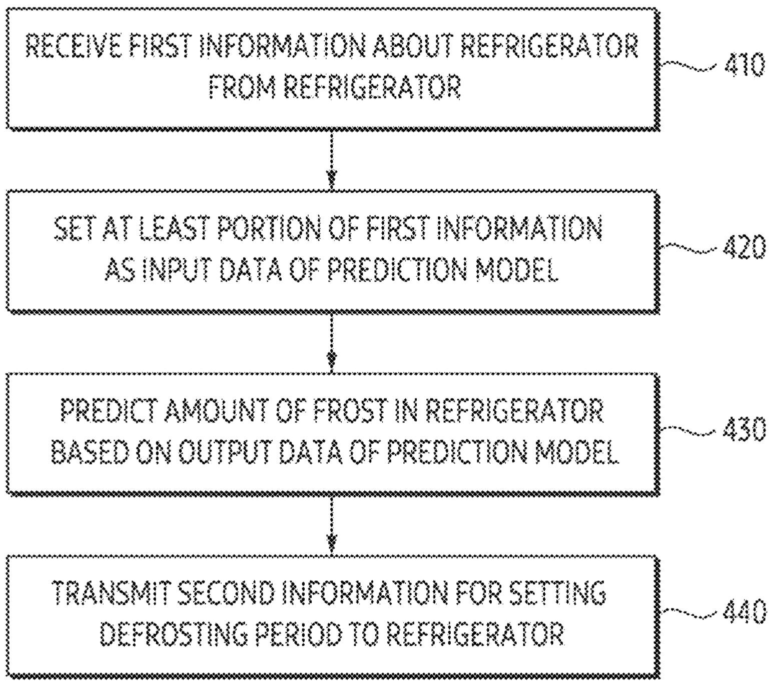
FIG. 4 is a flowchart illustrating an operation of an electronic device for setting a defrosting period of a refrigerator, according to one or more embodiments.

FIG. 4 is a flowchart illustrating an operation of an electronic device for setting a defrosting period of a refrigerator, according to one or more embodiments. In the following embodiment, each operation may be performed sequentially, but is not necessarily performed sequentially. For example, the sequence of each operation may be changed, and at least two operations may be performed in parallel.

In operation 410, the processor 210 of the electronic device 101 may receive first information about the refrigerator 102 from the refrigerator 102. For example, the processor 210 may receive the first information about the refrigerator 102 based on a designated time (or designated period) (e.g., 1 hour).

According to one or more embodiments, the first information may include information on a state of the refrigerator 102 as well as information necessary to predict amount of frost formed. For example, the first information may include characteristic information of the refrigerator 102 (e.g., information about type of refrigerator 102) and information obtained through a sensor of the refrigerator 102. According to one or more embodiments, a portion (e.g., a model of the refrigerator 102) of the first information may be received from the external electronic device 103.

The characteristic information of the refrigerator 102 may include, but is not limited to, information on a model of the refrigerator 102, information on capacity of the refrigerator 102, information on the number of doors of the refrigerator 102, information on whether a show case is included, and/or information on whether an ice maker is included.

The information obtained through the sensor of the refrigerator 102 may include, but is not limited to, at least one of information on previous defrost operation of the refrigerator 102, information on the current time, information on the number of door opening and closing of the refrigerator 102 during a designated time, information on a cumulative time of opening the door of the refrigerator 102, information on an external temperature of the refrigerator 102, information on an internal temperature of the refrigerator 102, and/or information on external humidity of the refrigerator 102.

A non-limiting example of the first information will be described in detail later in FIG. 7.

In operation 420, the processor 210 may set at least a portion of the first information as input data of the prediction model 261. For example, the processor 210 may input at least a portion of the first information as input data into the prediction model 261, based on receiving the first information. The processor 210 may receive (or obtain) an output data from the prediction model 261 based on the input data.

For example, the processor 210 may configure at least a portion of the first information based on time series vector values. At least a portion of the first information configured based on the time series vector values may be set as input data of the prediction model 261.

According to one or more embodiments, the processor 210 may identify information to be set as input data of the prediction model 261 among the first information. For example, the processor 210 may identify at least a portion of the first information, by processing (or preprocessing) the first information by using the refrigerator data processing unit 272. For example, at least a portion of the first information may include at least one of information on the previous defrost operation of the refrigerator 102, information on the external humidity of the refrigerator 102, information on the external temperature of the refrigerator 102, information on the internal temperature of the refrigerator 102, or information on the cumulative opening time (or opening time) of the door of the refrigerator 102.

According to one or more embodiments, the processor 210 may transfer (or transmit) the first information from the management device 250 to the prediction device 260. The processor 210 may set at least a portion of the first information as input data of the prediction model 261 included in the prediction device 260.

In operation 430, the processor 210 may predict an amount of frost in the refrigerator 102 based on the output data of the prediction model 261. For example, the processor 210 may identify the amount of frost in the refrigerator 102 as a defrosting time (or time required for defrosting). The processor 210 may identify the defrosting time based on the output data of the prediction model 261. For example, the greater the predicted amount of frost, the longer the defrosting time may be identified. The smaller the predicted amount of frost, the shorter the defrosting time may be identified. In one or more examples, the predicted amount of frost may correspond to a one of a plurality of predicted frost levels such "low," "moderate," or "high." In one or more examples, the predicted amount of frost may specify a quantity of an amount of frost in the refrigerator such an amount of frost per designated area.

In operation 440, the electronic device 101 may transmit second information for setting the defrosting period to the refrigerator 102. For example, the electronic device 101 may transmit the second information for setting the defrosting period of the refrigerator 102 to the refrigerator 102, based on the predicted amount of frost.

For example, the second information may include one of a plurality of levels for setting the defrosting period of the refrigerator 102. The processor 210 may indicate whether to change the defrosting period through one of the plurality of levels to set the defrosting period of the refrigerator 102. As an example, the plurality of levels may include a first level to a fourth level.

The processor 210 may transmit the second information indicating the first level to the refrigerator 102, in order to change the defrosting period of the refrigerator 102 set as a first period to a second period longer than the first period. For example, when the predicted amount of frost indicates that frost is hardly formed, the processor 210 may transmit the second information indicating the first level to the refrigerator 102 in order to increase the defrosting period of the refrigerator 102.

The processor 210 may transmit the second information indicating the second level to the refrigerator 102 in order to maintain the defrosting period of the refrigerator 102 set as the first period as the first period. For example, when the current defrosting period of the refrigerator 102 is suitable for removing frost based on the predicted amount of frost, the processor 210 may transmit the second information indicating the second level to the refrigerator 102.

The processor 210 may transmit the second information indicating the third level to the refrigerator 102 so that the refrigerator 102 starts defrosting. For example, when the predicted amount of frost indicates that too much frost is formed, defrosting is required, and defrosting is not currently being performed, the processor 210 may transmit the second information including the third level to the refrigerator 102 in order to immediately start defrosting.

The processor 210 may transmit the second information indicating the fourth level to the refrigerator 102 in order to perform defrosting according to an algorithm stored in the memory of the refrigerator 102. For example, when an error of the prediction model 261 occurs (e.g., output of prediction model is inconclusive), the processor 210 may transmit the second information including the fourth level to the refrigerator 102 in order to perform defrosting according to an algorithm stored in the memory of the refrigerator 102. The refrigerator 102 may perform defrosting by performing the operations described in FIG. 3 based on receiving the second information indicating the fourth level.

A non-limiting example of operation of the refrigerator 102 according to the plurality of levels described above will be described later with reference to FIG. 6.

Figure 5:
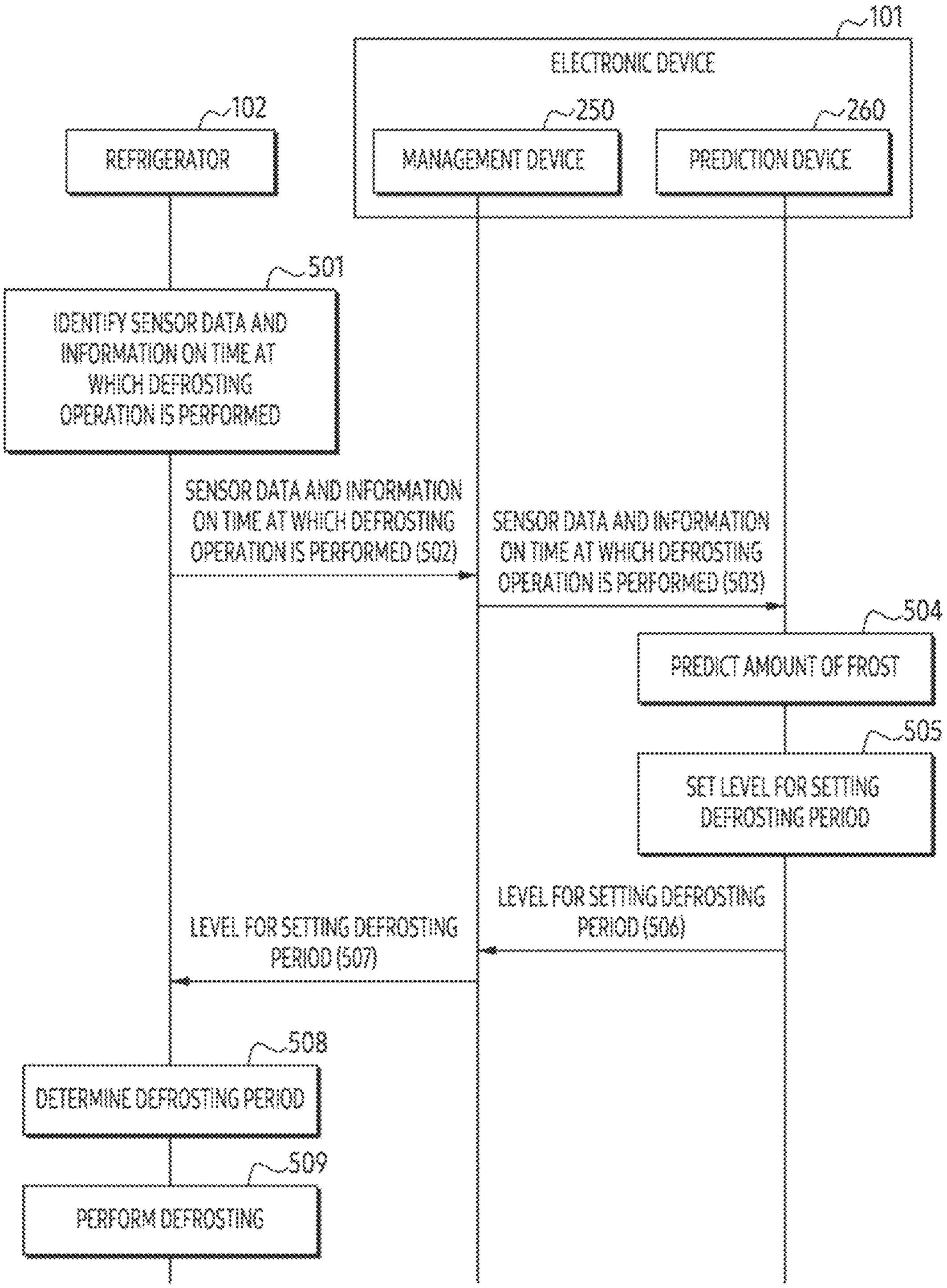
FIG. 5 illustrates an example of an operation of a refrigerator and an electronic device, according to one or more embodiments.

FIG. 5 illustrates an example of an operation of a refrigerator and an electronic device, according to one or more embodiments.

Referring to FIG. 5, in operation 501, the refrigerator 102 may identify sensor data and information on a time (or time point) at which defrosting operation is performed. The sensor data and the information on the time at which defrosting operation is performed may be an example of the first information of FIG. 4. For example, the sensor data may be an example of information obtained through a sensor of the refrigerator 102 of FIG. 4.

In operation 502, the refrigerator 102 may transmit the sensor data and the information on the time at which defrosting operation is performed to the management device 250 (or the electronic device 101). The management device 250 (or the electronic device 101) may receive the sensor data and the information on the time at which defrosting operation is performed from the refrigerator 102.

In operation 503, the management device 250 may transmit the sensor data and the information on the time at which defrosting operation is performed to the prediction device 260. For example, the electronic device 101 may provide the sensor data and the information on the time at which defrosting operation is performed to the prediction device 260 through the management device 250. The prediction device 260 may receive the sensor data and the information on the time at which defrosting operation is performed from the management device 250.

In operation 504, the prediction device 260 may predict an amount of frost in the refrigerator 102. The prediction device 260 may predict the amount of frost in the refrigerator 102 by using the prediction model 261. For example, the prediction device 260 may set the sensor data and the information on the time at which defrosting operation is performed as input data that is input into the prediction model 261. The prediction device 260 may predict the amount of frost in the refrigerator 102 based on output data of the prediction model 260 that is received in response to the input data. The prediction device 260 may identify a defrosting time based on the output data of the prediction model 260. For example, the defrosting time may mean a time required to remove frost from the refrigerator 102. The prediction model 261 may indicate the amount of frost in the refrigerator 102 through the defrosting time.

FIG. 5 illustrates an example in which the sensor data and the information on the time at which defrosting operation is performed set as input data of the prediction model 261. However, as understood by one of ordinary skill in the art, these embodiments are exemplary, and various information may be set as input data of the prediction model 261.

According to one or more embodiments, the prediction device 260 may train the prediction model 261 based on information on an operation history of the refrigerator 102 stored in the database 295 of the management device 250. As an example, the prediction device 260 may periodically train the prediction model 261. As an example, the prediction device 260 may train the prediction model 261 based on a decrease in the quality of the prediction model 261.

In operation 505, the prediction device 260 may set a level for setting a defrosting period of the refrigerator 102. For example, the prediction device 260 may set a level for setting the defrosting period of the refrigerator 102 based on the predicted amount of frost. For example, the prediction device 260 may set one of a plurality of levels based on the predicted amount of frost. The prediction device 260 may set the level for setting the defrosting period to any one of the first to fourth levels based on the predicted amount of frost.

For example, the defrosting period of the refrigerator 102 may be set to a first period. The prediction device 260 may identify that frost is hardly formed in the refrigerator 102. The prediction device 260 may set a level for setting the defrosting period to the first level in order to change the defrosting period of the refrigerator 102 from the first period to the second period longer than the first period.

For example, the prediction device 260 may identify that the current defrosting period of the refrigerator 102 is suitable for removing frost. The prediction device 260 may set the level for setting the defrosting period to the second level in order to maintain the defrosting period of the refrigerator 102 as the currently set period (e.g., the first period).

For example, the prediction device 260 may identify that too much frost is formed in the refrigerator 102. The prediction device 260 may identify that the predicted amount of frost is greater than the specified amount. The prediction device 260 may set the level for setting the defrosting period to the third level in order to immediately perform defrosting in the refrigerator 102.

For example, the prediction device 260 may identify that a problem occurred in the electronic device 101 and/or the prediction model 261. Based on identifying that the problem occurred in the electronic device 101 and/or the prediction model 261, the prediction device 260 may set the level for setting the defrosting period to the fourth level so that defrosting is performed according to an algorithm stored in the memory of the refrigerator 102.

In operation 506, the prediction device 260 may transmit (or transfer) the level for setting the defrosting period to the management device 250. The management device 250 may receive the level for setting the defrosting period from the prediction device 260. The management device 250 may store the level for setting the defrosting period received from the prediction device 260 in the database 295 (or the memory 230).

In operation 507, the management device 250 may transmit the level for setting the defrosting period to the refrigerator 102. The refrigerator 102 may receive the level for setting the defrosting period from the management device 250.

In operation 508, the refrigerator 102 may determine the defrosting period. For example, the refrigerator 102 may determine the defrosting period based on the level for setting the defrosting period.

In operation 509, the refrigerator 102 may perform defrosting based on the determined defrosting period.

For example, the refrigerator 102 may increase the defrosting period based on identifying that the level for setting the defrosting period is the first level. For example, the refrigerator 102 may change the defrosting period from the first period to the second period longer than the first period based on identifying that the level for setting the defrosting period is the first level. The refrigerator 102 may perform defrosting based on the second period.

For example, the refrigerator 102 may maintain the defrosting period based on identifying that the level for setting the defrosting period is the second level. As an example, the refrigerator 102 may maintain the defrosting period as the first period based on identifying that the level for setting the defrosting period is the second level. The refrigerator 102 may perform defrosting based on the first period.

For example, the refrigerator 102 may immediately start defrosting based on identifying that the level for setting the defrosting period is the third level and the refrigerator 102 is not current in a state of defrosting.

For example, based on identifying that the level for setting the defrosting period is the fourth level, the refrigerator 102 may perform defrosting based on an algorithm stored in the memory of the refrigerator 102.

Although FIG. 5 illustrates that the management device 250 and the prediction device 260 are included in the electronic device 101, the management device 250 and the prediction device 260 may be configured as separate devices.

FIG. 5 illustrates an example in which the level for setting the defrosting period is transmitted to the refrigerator 102, but it is not limited thereto. According to one or more embodiments, the management device 250 (or the electronic device 101) may transmit information on the predicted amount of frost (or defrosting time) to the refrigerator 102.

Figure 6:
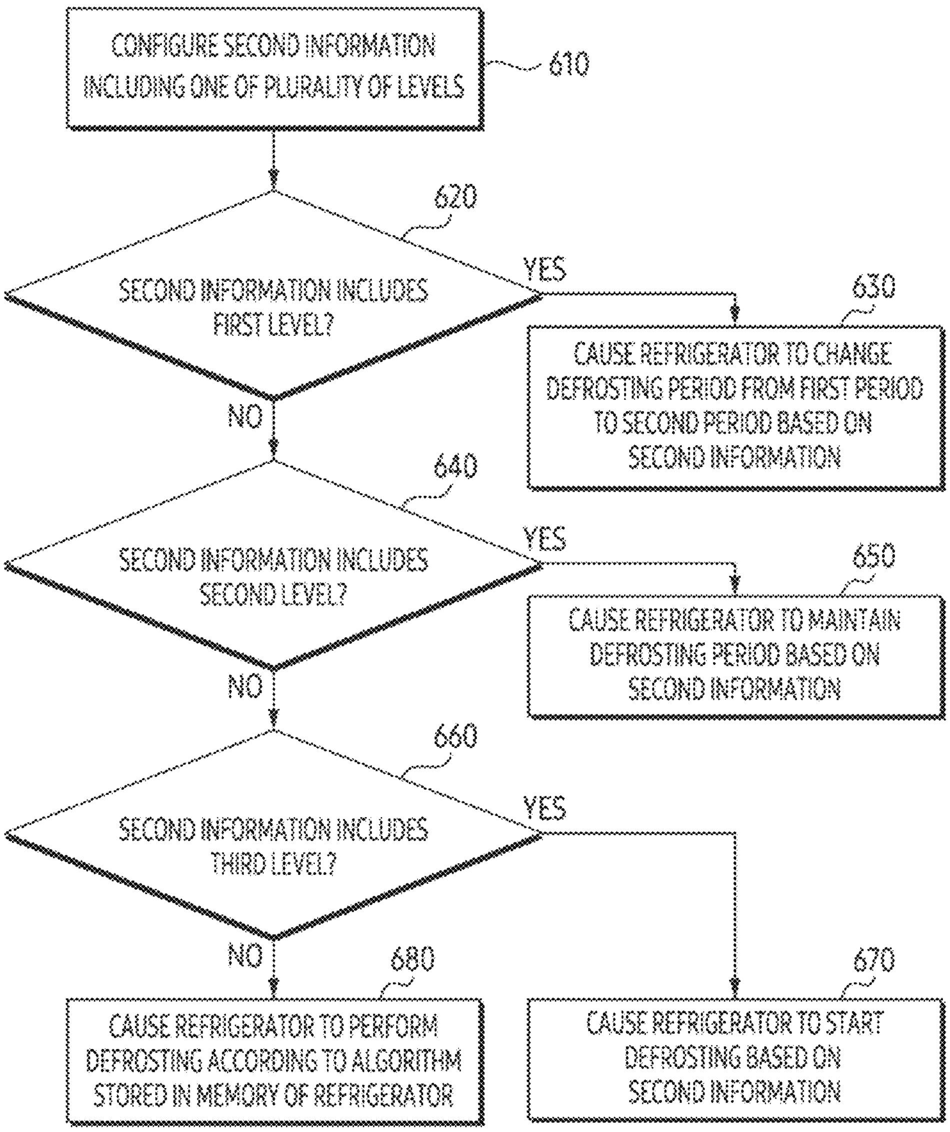
FIG. 6 is a flowchart illustrating an operation of an electronic device for setting a defrosting period of a refrigerator, according to one or more embodiments.

FIG. 6 is a flowchart illustrating an operation of an electronic device for setting a defrosting period of a refrigerator, according to one or more embodiments. In the following embodiment, each operation may be performed sequentially, but is not necessarily performed sequentially. For example, the sequence of each operation may be changed, and at least two operations may be performed in parallel.

Referring to FIG. 6, operations 610 to 680 may be related to operations 505 to 507 of FIG. 5. For example, operation 610 may be performed in the prediction device 260, and operations 620 to 680 may be performed in the management device 250.

In operation 610, the processor 210 may configure second information including one of the plurality of levels. For example, the processor 210 may configure the second information including one of the first to fourth levels. Operations of the refrigerator 102 according to the first to fourth levels may be set as illustrated in Table 2.

TABLE 2

| Level | Defrosting time | Refrigerator operation |
|---|---|---|
| First level | greater than or equal to 0 minutes and less than 50 minutes | Change defrosting period to long |
| Second level | greater than or equal to 50 minutes and less than 65 minutes | Maintain defrosting period |
| Third level | greater than or equal to 65 minutes | Immediately perform defrosting |
| Fourth level | Abnormality occur | Defrosting operation according to refrigerator's own algorithm |

The processor 210 may identify one of the first to fourth levels based on a defrosting time (or time required for defrosting). The processor 210 may control operation of the refrigerator 102 based on the defrosting time (or time required for defrosting). According to one or more embodiments, the first to third levels may be set to integer values. The fourth level may be set to a negative value (e.g., −1000).

In operation 620, the processor 210 may identify whether the second information includes the first level. The processor 210 may identify whether the first level is included in the second information.

In operation 630, when the second information includes the first level, the processor 210 may cause the refrigerator 102 to change the defrosting period from the first period to the second period based on the second information. For example, the processor 210 may cause the refrigerator 102 to change the defrosting period of the refrigerator 102 from the first period to the second period longer than the first period by transmitting the second information to the refrigerator 102.

In operation 640, when the second information does not include the first level, the processor 210 may identify whether the second information includes the second level. When the second information does not include the first level, the processor 210 may identify whether the second level is included in the second information.

In operation 650, when the second information includes the second level, the processor 210 may cause the refrigerator 102 to maintain the defrosting period based on the second information. For example, the processor 210 may cause the refrigerator 102 to maintain the defrosting period of the refrigerator 102 by transmitting the second information to the refrigerator 102.

In operation 660, when the second information does not include the second level, the processor 210 may identify whether the second information includes the third level. The processor 210 may identify whether the third level is included in the second information, based on identifying that the second information does not include the second level.

In operation 670, when the second information includes the third level, the processor 210 may cause the refrigerator 102 to start defrosting based on the second information. For example, the processor 210 may cause the refrigerator 102 to start defrosting the refrigerator 102 by transmitting the second information to the refrigerator 102.

In operation 680, when the second information does not include the third level, the processor 210 may cause the refrigerator 102 to perform defrosting according to an algorithm stored in the memory of the refrigerator 102 based on the second information. For example, when the second information includes one of the first to fourth levels, the processor 210 may identify that the second information includes the fourth level based on identifying that the second information does not include the third level. Based on identifying that the second information includes the fourth level, the processor 210 may cause the refrigerator 102 to perform defrosting according to refrigerator's own algorithm.

Since the second information includes one of the first to fourth levels, the processor 210 may identify that the second information includes the fourth level based on identifying that the second information does not include the first to third levels. However, it is not limited thereto. For example, the processor 210 may identify whether the second information includes the fourth level. The processor 210 may perform operation 680 based on identifying that the second information includes the fourth level.

Although FIG. 6 illustrates an example in which the second information includes one of the first to fourth levels as illustrated in Table 2, the second information may be configured to include one of a plurality of levels (e.g., first to sixth levels) according to one or more embodiments.

Figure 7:
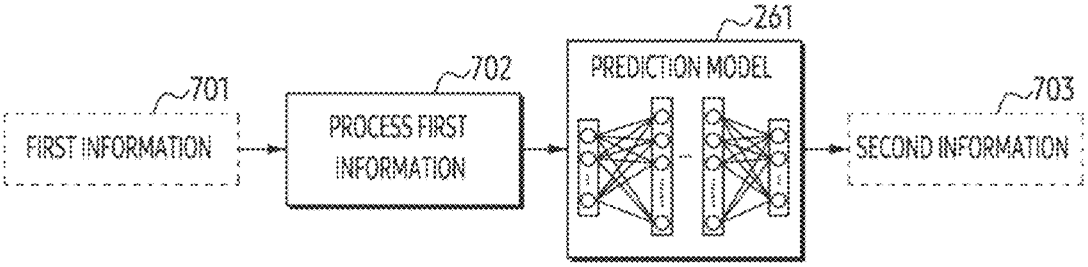
FIG. 7 illustrates an example of an operation of an electronic device, according to one or more embodiments.

FIG. 7 illustrates an example of an operation of an electronic device, according to one or more embodiments.

Referring to FIG. 7, the processor 210 may obtain first information 701. The processor 210 may receive the first information 701 from the refrigerator 102. The first information 701 may be related to the refrigerator 102. The first information 701 may include characteristic information of the refrigerator 102 and/or information obtained through a sensor of the refrigerator 102.

For example, the first information 701 may include at least one of information on previous defrost operation of the refrigerator 102, information on the number of door opening and closing times of the refrigerator 102, information on the internal temperature of the refrigerator 102, information on the external temperature of the refrigerator 102, information on the external humidity of the refrigerator 102, information on opening time of the door, information on rotation speed (e.g., revolution per minutes (rpm)) of a fan of the refrigerator 102, information on whether a compressor of the refrigerator 102 operates, information on a model of the refrigerator 102, information on the number of doors of the refrigerator 102, information on the current time, information on whether a show case is included, and/or information on whether an ice maker is included.

The processor 210 may process the first information 701 by performing operation 702. The processor 210 may identify (or determine) at least a portion of the first information 701 based on processing (or preprocessing) the first information 701. For example, the processor 210 may identify information having a high causal relationship with formation of frost among the first information 701. The processor 210 may identify at least a portion of the first information 701 by identifying the information having a high causal relationship with the formation of frost. For example, the processor 210 may identify at least a portion of the first information 701 by calculating a correlation between data included in the first information.

For example, at least a portion of the first information 701 may include information on the previous defrost operation of the refrigerator 102, information on the external humidity of the refrigerator 102, information on the external temperature of the refrigerator 102, information on the internal temperature of the refrigerator 102, or information on the opening time of the door of the refrigerator 102. The processor 210 may identify only information necessary for learning or inputting the prediction model 261 by identifying at least a portion of the first information 701. For example, the information on the previous defrost operation may be time information required for previous (or immediately before) defrosting. According to one or more embodiments, the processor 210 may train the prediction model 261 based on at least a portion of the first information 701. After the prediction model 261 is learned, the processor 210 may identify the quality. The processor 210 may additionally train the prediction model 261 based on identifying that the quality is less than or equal to a designated value.

According to one or more embodiments, data for training of the prediction model 261 and data for inputting of the prediction model 261 may be distinguished. For example, information on whether a show case is included and/or information on whether an ice maker is included may be set as data for training of the prediction model 261. On the other hand, the information on whether a show case is included and/or the information on whether an ice maker is included may not be set as information for inputting of the prediction model 261. The above-described example is illustrative and limited thereto.

According to one or more embodiments, the first information may include a time required for defrosting of the refrigerator 102 in the past. The processor 210 may use the time required for defrosting of the refrigerator 102 in the past for training and/or prediction of the prediction model 261. For example, the processor 210 may train the prediction model 261 based on the time required for defrosting of the refrigerator 102 in the past (e.g., training based on historical data). For example, the processor 210 may set the time required for defrosting in the past as one of input data.

According to one or more embodiments, the processor 210 may set at least a portion of the first information 701 as input data of the prediction model 261. The processor 210 may obtain second information 703 based on output data of the prediction model 261. For example, the second information 703 may include a defrosting time (or a time required for defrosting). The defrosting time may mean amount of frost in the refrigerator 102.

Figure 8:
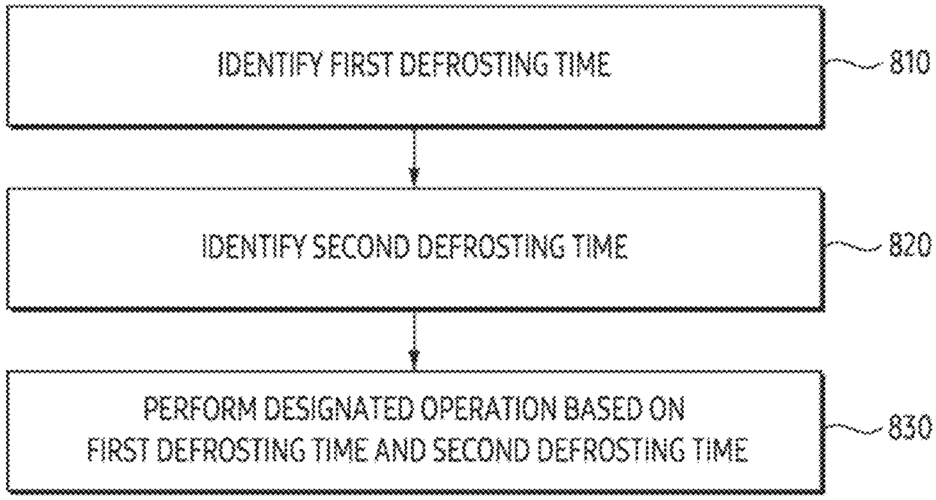
FIG. 8 is a flowchart illustrating an operation of an electronic device, according to one or more embodiments.

FIG. 8 is a flowchart illustrating an operation of an electronic device, according to one or more embodiments. In the following embodiment, each operation may be performed sequentially, but is not necessarily performed sequentially. For example, the sequence of each operation may be changed, and at least two operations may be performed in parallel.

In operation 810, the processor 210 may identify or determine a first defrosting time. For example, the processor 210 may receive first information about the refrigerator 102 from the refrigerator 102 based on a designated period. The processor 210 may identify or determine a first defrosting time performed in the refrigerator 102 based on the first information. For example, the first defrosting time may mean a time when defrosting is actually performed.

In operation 820, the processor 210 may identify or determine a second defrosting time according to the predicted amount of frost. For example, the second defrosting time may mean a time required to remove the predicted frost. As an example, the second defrosting time may mean a time predicted to be required for removal of frost.

In operation 830, the processor 210 may perform a designated operation based on the first defrosting time and the second defrosting time.

According to one or more embodiments, the processor 210 may identify whether an error between the first defrosting time and the second defrosting time is greater than a threshold value. The processor 210 may change a designated period set for the refrigerator 102 to transmit the first information, based on identifying that the error between the first defrosting time and the second defrosting time is greater than the threshold value. For example, the processor 210 may reduce the designated period by half based on identifying that the error between the first defrosting time and the second defrosting time is greater than the threshold value. For example, the processor 210 may reduce the designated period by a specific value (e.g., 20 minutes), based on identifying that the error between the first defrosting time and the second defrosting time is greater than the threshold value. The processor 210 may frequently receive the first information on the refrigerator 102 by reducing the designated period. The processor 210 may reduce an error of the second defrosting time with respect to the first defrosting time, by frequently receiving the first information on the refrigerator. The processor 210 may increase the quality of the prediction model 261 by frequently receiving the first information on the refrigerator.

According to one or more embodiments, the processor 210 may identify an actual time required for defrosting during a designated time (e.g., one day) and a predicted time required for defrosting by using the first defrosting time and the second defrosting time. The processor 210 may identify an error of the predicted time required for defrosting, based on the actual time required for defrosting and the predicted time required for defrosting. For example, the processor 210 may identify the error of the predicted time required for defrosting, based on mean square error, mean absolute error, and/or root mean square error.

For example, the processor 210 may reduce a designated period set to transmit the first information, based on identifying that the error of the predicted time required for defrosting is greater than or equal to a threshold value (e.g., 5 minutes). For example, the processor 210 may reduce the designated period set to transmit the first information by half, based on identifying that the error of the predicted time required for defrosting is greater than or equal to the threshold value (e.g., 5 minutes). The processor 210 may improve the quality of the prediction model 261 by reducing the designated period.

For example, the processor 210 may update the prediction model 261, based on identifying that the error of the predicted time required for defrosting is greater than or equal to the threshold value (e.g., 5 minutes). For example, A/B test may be performed based on the error of the predicted time required for defrosting and an error identified recently (e.g., a day earlier or a week ago). The processor 210 may update the prediction model 261 based on a result of the A/B test.

According to one or more embodiments, the processor 210 may regenerate or update the prediction model 261, based on a change in the first information received from the refrigerator 102. According to one or more embodiments, the processor 210 may regenerate or update the prediction model 261 based on a change in the designated period set for transmitting the first information. According to one or more embodiments, the prediction model 261 may be regenerated or updated, based on a change in the quality of the prediction model 261. According to one or more embodiments, the processor 210 may learn or update the prediction model 261 based on a change in a pattern of the first information. The processor 210 may identify homogeneity between an external temperature value of the refrigerator 102 received from the refrigerator 102 and an external temperature value of the refrigerator 102 used to train the prediction model 261, based on the A/B test. The processor 210 may learn or update the prediction model 261 based on that a value indicating the identified homogeneity being out of a designated range. According to one or more embodiments, the processor 210 may learn or update the prediction model 261 based on a designated period (e.g., 1 week or 2 weeks).

Figure 9:
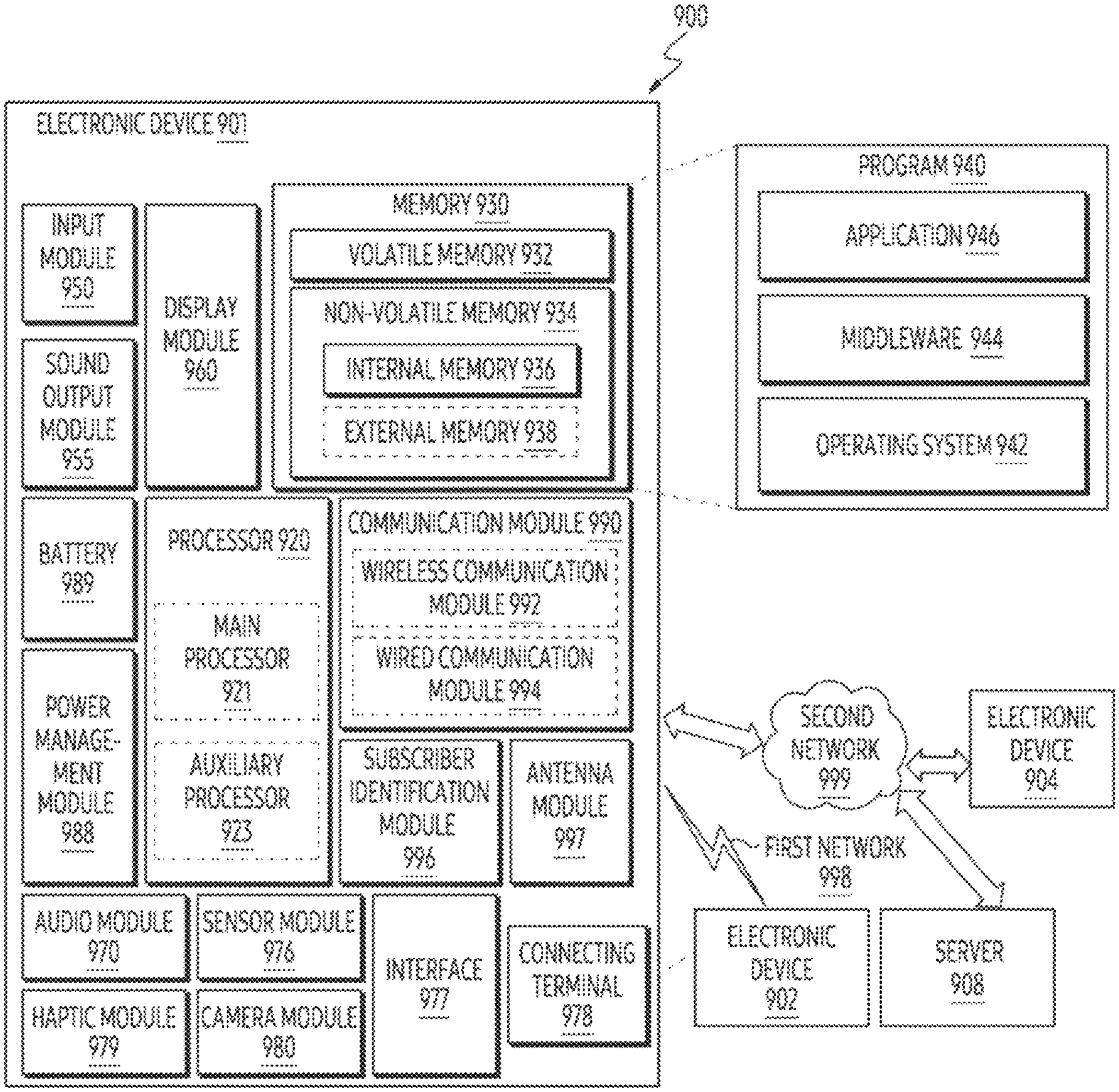
FIG. 9 is a block diagram of an electronic device in a network environment according to one or more embodiments.

FIG. 9 is a block diagram of an electronic device in a network environment according to one or more embodiments.

Referring to FIG. 9, the electronic device 901 in the network environment 900 may communicate with an electronic device 902 via a first network 998 (e.g., a short-range wireless communication network), or at least one of an electronic device 904 or a server 908 via a second network 999 (e.g., a long-range wireless communication network). According to an embodiment, the electronic device 901 may communicate with the electronic device 904 via the server 908. According to an embodiment, the electronic device 901 may include a processor 920, memory 930, an input module 950, a sound output module 955, a display module 960, an audio module 970, a sensor module 976, an interface 977, a connecting terminal 978, a haptic module 979, a camera module 980, a power management module 988, a battery 989, a communication module 990, a subscriber identification module (SIM) 996, or an antenna module 997. In some embodiments, at least one of the components (e.g., the connecting terminal 978) may be omitted from the electronic device 901, or one or more other components may be added in the electronic device 901. In some embodiments, some of the components (e.g., the sensor module 976, the camera module 980, or the antenna module 997) may be implemented as a single component (e.g., the display module 960).

The processor 920 may execute, for example, software (e.g., a program 940) to control at least one other component (e.g., a hardware or software component) of the electronic device 901 coupled with the processor 920, and may perform various data processing or computation. According to an embodiment, as at least part of the data processing or computation, the processor 920 may store a command or data received from another component (e.g., the sensor module 976 or the communication module 990) in volatile memory 932, process the command or the data stored in the volatile memory 932, and store resulting data in non-volatile memory 934. According to an embodiment, the processor 920 may include a main processor 921 (e.g., a central processing unit (CPU) or an application processor (AP)), or an auxiliary processor 923 (e.g., a graphics processing unit (GPU), a neural processing unit (NPU), an image signal processor (ISP), a sensor hub processor, or a communication processor (CP)) that is operable independently from, or in conjunction with, the main processor 921. For example, when the electronic device 901 includes the main processor 921 and the auxiliary processor 923, the auxiliary processor 923 may be adapted to consume less power than the main processor 921, or to be specific to a specified function. The auxiliary processor 923 may be implemented as separate from, or as part of the main processor 921.

The auxiliary processor 923 may control at least some of functions or states related to at least one component (e.g., the display module 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to an embodiment, the auxiliary processor 923 (e.g., an image signal processor or a communication processor) may be implemented as part of another component (e.g., the camera module 980 or the communication module 990) functionally related to the auxiliary processor 923. According to an embodiment, the auxiliary processor 923 (e.g., the neural processing unit) may include a hardware structure specified for artificial intelligence model processing. An artificial intelligence model may be generated by machine learning. Such learning may be performed, e.g., by the electronic device 901 where the artificial intelligence is performed or via a separate server (e.g., the server 908). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input module 950 may receive a command or data to be used by another component (e.g., the processor 920) of the electronic device 901, from the outside (e.g., a user) of the electronic device 901. The input module 950 may include, for example, a microphone, a mouse, a keyboard, a key (e.g., a button), or a digital pen (e.g., a stylus pen). The sound output module 955 may output sound signals to the outside of the electronic device 901.

The sound output module 955 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 960 may visually provide information to the outside (e.g., a user) of the electronic device 901. The display module 960 may include, for example, a display, a hologram device, or a projector and control circuitry to control a corresponding one of the display, hologram device, and projector. According to an embodiment, the display module 960 may include a touch sensor adapted to detect a touch, or a pressure sensor adapted to measure the intensity of force incurred by the touch.

The audio module 970 may convert a sound into an electrical signal and vice versa. According to an embodiment, the audio module 970 may obtain the sound via the input module 950, or output the sound via the sound output module 955 or a headphone of an external electronic device (e.g., an electronic device 902) directly (e.g., wiredly) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. According to an embodiment, the sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device (e.g., the electronic device 902) directly (e.g., wiredly) or wirelessly. According to an embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device (e.g., the electronic device 902). According to an embodiment, the connecting terminal 978 may include, for example, a HDMI connector, a USB connector, a SD card connector, or an audio connector (e.g., a headphone connector).

The haptic module 979 may convert an electrical signal into a mechanical stimulus (e.g., a vibration or a movement) or electrical stimulus which may be recognized by a user via his tactile sensation or kinesthetic sensation. According to an embodiment, the haptic module 979 may include, for example, a motor, a piezoelectric element, or an electric stimulator.

The camera module 980 may capture a still image or moving images. According to an embodiment, the camera module 980 may include one or more lenses, image sensors, image signal processors, or flashes.

The power management module 988 may manage power supplied to the electronic device 901. According to an embodiment, the power management module 988 may be implemented as at least part of, for example, a power management integrated circuit (PMIC).

The battery 989 may supply power to at least one component of the electronic device 901. According to an embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the application processor (AP)) and supports a direct (e.g., wired) communication or a wireless communication. According to an embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or infrared data association (IrDA)) or the second network 999 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The wireless communication module 992 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 992 may support a high-frequency band (e.g., the mmWave band) to achieve, e.g., a high data transmission rate. The wireless communication module 992 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 992 may support various requirements specified in the electronic device 901, an external electronic device (e.g., the electronic device 904), or a network system (e.g., the second network 999). According to an embodiment, the wireless communication module 992 may support a peak data rate (e.g., 20 Gbps or more) for implementing eMBB, loss coverage (e.g., 964 dB or less) for implementing mMTC, or U-plane latency (e.g., 0.5 ms or less for each of downlink (DL) and uplink (UL), or a round trip of 9 ms or less) for implementing URLLC.

The antenna module 997 may transmit or receive a signal or power to or from the outside (e.g., the external electronic device) of the electronic device 901. According to an embodiment, the antenna module 997 may include an antenna including a radiating element composed of a conductive material or a conductive pattern formed in or on a substrate (e.g., a printed circuit board (PCB)). According to an embodiment, the antenna module 997 may include a plurality of antennas (e.g., array antennas). In such a case, at least one antenna appropriate for a communication scheme used in the communication network, such as the first network 998 or the second network 999, may be selected, for example, by the communication module 990 (e.g., the wireless communication module 992) from the plurality of antennas. The signal or the power may then be transmitted or received between the communication module 990 and the external electronic device via the selected at least one antenna. According to an embodiment, another component (e.g., a radio frequency integrated circuit (RFIC)) other than the radiating element may be additionally formed as part of the antenna module 997.

According to various embodiments, the antenna module 997 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 901 and the external electronic device 904 via the server 908 coupled with the second network 999. Each of the electronic devices 902 or 904 may be a device of a same type as, or a different type, from the electronic device 901. According to an embodiment, all or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, mobile edge computing (MEC), or client-server computing technology may be used, for example. The electronic device 901 may provide ultra low-latency services using, e.g., distributed computing or mobile edge computing. In another embodiment, the external electronic device 904 may include an internet-of-things (IoT) device. The server 908 may be an intelligent server using machine learning and/or a neural network. According to an embodiment, the external electronic device 904 or the server 908 may be included in the second network 999. The electronic device 901 may be applied to intelligent services (e.g., smart home, smart city, smart car, or healthcare) based on 5G communication technology or IoT-related technology.

The electronic device 901 (or the server 908) of FIG. 9 may be an example of the electronic device 101 described with reference to FIGS. 1 to 8.

According to one or more embodiments, an electronic device may comprise a communication circuit, a memory storing instructions, and a processor. The instructions, when being executed by the processor, may cause the electronic device to receive, from a refrigerator connected with the electronic device through a network, first information on the refrigerator. The instructions, when being executed by the processor, may cause the electronic device to set at least part of the first information as input data of a prediction model for managing a defrosting period of the refrigerator. The instructions, when being executed by the processor, may cause the electronic device to predict, based on output data of the prediction model, amount of frost in the refrigerator. The instructions, when being executed by the processor, may cause the electronic device to transmit second information for setting the defrosting period of the refrigerator, based on the predicted amount of the frost.

According to one or more embodiments, the second information may comprise one of a plurality of levels for setting the defrosting period of the refrigerator.

According to one or more embodiments, the instructions, when being executed by the processor, may cause the electronic device to, based on the second information comprising a first level among the plurality of levels, cause the refrigerator to change the defrosting period from a first period to a second period, which is longer than the first period.

According to one or more embodiments, the instructions, when being executed by the processor, may cause the electronic device to, based on the second information comprising a second level among the plurality of levels, cause the refrigerator to maintain the defrosting period as the first period.

According to one or more embodiments, the instructions, when being executed by the processor, may cause the electronic device to, based on the second information comprising a third level among the plurality of levels, cause the refrigerator to start defrosting.

According to one or more embodiments, the instructions, when being executed by the processor, may cause the electronic device to, based on the second information comprising a fourth level among the plurality of levels, cause the refrigerator to perform defrosting according to an algorithm stored in a memory of the refrigerator.

According to one or more embodiments, the instructions, when being executed by the processor, may cause the electronic device to receive, based on a designated period, the first information on the refrigerator from the refrigerator. The instructions, when being executed by the processor, may cause the electronic device to identify a first defrosting time performed by the refrigerator, based on the first information. The instructions, when being executed by the processor, may cause the electronic device to identify a second defrosting time according to the predicted amount of the frost. The instructions, when being executed by the processor, may cause the electronic device to transmit, to the refrigerator, third information for changing the designated period, based on the first defrosting time and the second defrosting time.

According to one or more embodiments, the instructions, when being executed by the processor, may cause the electronic device to, based on identifying that difference between the first defrosting time and the second defrosting time is out of a designated range, update the prediction model.

According to one or more embodiments, the instructions, when being executed by the processor, may cause the electronic device to set the first information as learning data for the prediction model.

According to one or more embodiments, the first information may comprise at least one of information on previous defrost operations of the refrigerator, information on humidity of outside of the refrigerator, information on external temperature of the refrigerator, information on internal temperature of the refrigerator, or information on time that a door of the refrigerator is open.

According to one or more embodiments, the instructions, when being executed by the processor, may cause the electronic device to transmit information for representing a state of the refrigerator to an external electronic device connected with the electronic device through the network. The information for representing the state of the refrigerator may be used for displaying the state of the refrigerator through a display of the external electronic device.

According to one or more embodiments, a method performed by an electronic device may comprise receiving, from a refrigerator connected with the electronic device through a network, first information on the refrigerator. The method may comprise setting at least part of the first information as input data of a prediction model for managing a defrosting period of the refrigerator. The method may comprise predicting, based on output data of the prediction model, amount of frost in the refrigerator. The method may comprise, based on the predicted amount of the frost, transmitting second information for setting the defrosting period of the refrigerator.

According to one or more embodiments, the second information may comprise one of a plurality of levels for setting the defrosting period of the refrigerator.

According to one or more embodiments, the method may comprise, based on the second information comprising a first level among the plurality of levels, causing the refrigerator to change the defrosting period from a first period to a second period which is longer than the first period.

According to one or more embodiments, the method may comprise, based on the second information comprising a second level among the plurality of levels, causing the refrigerator to maintain the defrosting period as the first period.

According to one or more embodiments, the method may comprise, based on the second information comprising a third level among the plurality of levels, causing the refrigerator to start defrosting.

According to one or more embodiments, the method may comprise, based on the second information comprising a fourth level among the plurality of levels, causing the refrigerator to perform defrosting according to an algorithm stored in a memory of the refrigerator.

According to one or more embodiments, the method may comprise receiving, based on a designated period, the first information on the refrigerator from the refrigerator. The method may comprise, based on the first information, identifying a first defrosting time performed by the refrigerator. The method may comprise identifying a second defrosting time according to the predicted amount of the frost. The method may comprise, based on the first defrosting time and the second defrosting time, transmitting, to the refrigerator, third information for changing the designated period.

According to one or more embodiments, the first information may comprise at least one of information on previous defrost operations of the refrigerator, information on humidity of outside of the refrigerator, information on external temperature of the refrigerator, information on internal temperature of the refrigerator, or information on time that a door of the refrigerator is open.

According to one or more embodiments, a non-transitory computer readable storage medium may store one or more programs. The one or more programs may comprise instructions which, when being executed by a processor of an electronic device, cause the electronic device to receive, from a refrigerator connected with the electronic device through a network, first information on the refrigerator. The one or more programs may comprise instructions which, when being executed by the processor, cause the electronic device to set at least part of the first information as input data of a prediction model for managing a defrosting period of the refrigerator. The one or more programs may comprise instructions which, when being executed by the processor, cause the electronic device to predict, based on output data of the prediction model, amount of frost in the refrigerator. The one or more programs may comprise instructions which, when being executed by the processor, cause the electronic device to transmit second information for setting the defrosting period of the refrigerator, based on the predicted amount of the frost.

According to one or more embodiments, an electronic device (or server) may identify amount of frost in a refrigerator through various factors including a surrounding environment (e.g., humidity, temperature, place) of the refrigerator. The electronic device may predict the amount of frost by using data on a use history of the refrigerator and characteristic data of the refrigerator, and control the refrigerator to perform defrosting according to the optimized period. Since defrosting is performed according to the optimized period in the refrigerator, the performance of the refrigerator may be improved and energy efficiency may be improved.

The electronic device according to one or more embodiments may be one of various types of electronic devices. The electronic devices may include, for example, a portable communication device (e.g., a smartphone), a computer device, a portable multimedia device, a portable medical device, a camera, a wearable device, or a home appliance. According to one or more embodiments of the disclosure, the electronic devices are not limited to those described above.

It should be appreciated that one or more embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with" another element (e.g., a second element), it means that the element may be coupled with the other element directly (e.g., wiredly), wirelessly, or via a third element.

As used in connection with one or more embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to one or more embodiments, the module may be implemented in a form of an application-specific integrated circuit (ASIC).

One or more embodiments as set forth herein may be implemented as software (e.g., the program 940) including one or more instructions that are stored in a storage medium (e.g., internal memory 936 or external memory 938) that is readable by a machine (e.g., the electronic device 901). For example, a processor (e.g., the processor 920) of the machine (e.g., the electronic device 901) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between a case in which data is semi-permanently stored in the storage medium and a case in which the data is temporarily stored in the storage medium.

According to one or more embodiments, a method according to one or more embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one or more embodiments, each component (e.g., a module or a program) of the above-described components may include a single entity or multiple entities, and some of the multiple entities may be separately disposed in different components. According to one or more embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to one or more embodiments, operations performed by the module, the program, or another component may be carried out sequentially, in parallel, repeatedly, or heuristically, or one or more of the operations may be executed in a different order or omitted, or one or more other operations may be added.

No claim element is to be construed under the provisions of 35 U.S.C. § 112, sixth paragraph, unless the element is expressly recited using the phrase "means for" or "means."

What is claimed is:

1. An electronic device comprising:

communication circuitry;

memory including one or more storage mediums storing instructions; and at least one processor including processing circuitry, wherein the instructions, when being executed by the at least one processor individually or collectively, cause the electronic device to:

receive, via the communication circuitry from a refrigerator connected with the electronic device through a network, first information on the refrigerator, input, as input data, at least a portion of the first information to a prediction model for managing a defrosting period of the refrigerator, obtain a defrosting time, which is a time for removing a frost formed around an evaporator of the refrigerator, as output data from the prediction model in response to the input data, determine, based on the defrosting time, a frost level of a plurality of frost levels for setting the defrosting period of the refrigerator, and transmit, via the communication circuitry to the refrigerator, second information comprising the determined frost level, wherein the second information causes the refrigerator to:

set the defrosting period of the refrigerator and adjust a temperature around the evaporator of the refrigerator.

2. The electronic device of claim 1, wherein the plurality of frost levels comprise a first frost level that causes the refrigerator to change the defrosting period from a first period to a second period that is longer than the first period.

3. The electronic device of claim 2, wherein the plurality of frost levels comprise a second frost level that causes the refrigerator to maintain the defrosting period as the first period.

4. The electronic device of claim 3, wherein the plurality of frost levels comprises a third frost level that causes the refrigerator to start defrosting.

5. The electronic device of claim 4, wherein the plurality of frost levels comprise a fourth frost level that causes the refrigerator to perform defrosting according to an algorithm stored in a memory of the refrigerator.

6. The electronic device of claim 1, wherein the defrosting time obtained as the output data from the prediction model is a second defrosting time, wherein the instructions, when being executed by the at least one processor individually or collectively, cause the electronic device to:

receive, based on a designated period, the first information on the refrigerator from the refrigerator, based on the first information, identify a first defrosting time corresponding to a time that defrosting is performed by the refrigerator, identify the second defrosting time based on the first defrosting time, and based on the first defrosting time and the second defrosting time, transmit to the refrigerator over the network, third information for changing the designated period.

7. The electronic device of claim 6, wherein the instructions, when being executed by the at least one processor individually or collectively, cause the electronic device to, based on determining that a difference between the first defrosting time and the second defrosting time is out of a designated range, update the prediction model.

8. The electronic device of claim 1, wherein the instructions, when being executed by the at least one processor individually or collectively, cause the electronic device to set the first information as learning data that trains the prediction model to output the defrosting time.

9. The electronic device of claim 1, wherein the first information comprises at least one of information on previous defrost operations of the refrigerator, information on humidity of an environment outside of the refrigerator, information on an external temperature of the environment outside of the refrigerator, information on an internal temperature of the refrigerator, or information on an amount of time that a door of the refrigerator is open.

10. The electronic device of claim 1, wherein the instructions, when being executed by the at least one processor individually or collectively, cause the electronic device to transmit, via the communication circuitry, information indicating a state of the refrigerator to an external electronic device connected with the electronic device through the network, and wherein the information indicating the state of the refrigerator is used for displaying the state of the refrigerator through a display of the external electronic device.

11. A method performed by an electronic device, wherein the method comprising:

receiving, from a refrigerator connected with the electronic device through a network, first information on the refrigerator;

inputting, as input data, at least a portion of the first information to a prediction model for managing a defrosting period of the refrigerator;

obtaining a defrosting time, which is a time for removing a frost formed around an evaporator of the refrigerator, as output data from the prediction model in response to the input data;

determining, based on the defrosting time, a frost level of a plurality of frost levels for setting the defrosting period of the refrigerator; and transmitting second information comprising the determined frost level, wherein the second information causes the refrigerator to:

set the defrosting period of the refrigerator and adjust a temperature around the evaporator of the refrigerator.

12. The method of claim 11, wherein the plurality of frost levels comprise a first frost level that causes the refrigerator to change the defrosting period from a first period to a second period longer than the first period.

13. The method of claim 12, wherein the plurality of frost levels comprise a second frost level that causes the refrigerator to maintain the defrosting period as the first period.

14. The method of claim 13, wherein the plurality of frost levels comprise a third frost level that causes the refrigerator to start defrosting.

15. The method of claim 14, wherein the plurality of frost levels comprise a fourth frost level that causes the refrigerator to perform defrosting according to an algorithm stored in a memory of the refrigerator.

16. The method of claim 11, wherein the defrosting time is a second defrosting time, wherein the method further comprises:

receiving, based on a designated period, the first information on the refrigerator from the refrigerator, based on the first information, identifying a first defrosting time corresponding to a time that defrosting is performed by the refrigerator, identifying the second defrosting time based on the first defrosting time, and based on the first defrosting time and the second defrosting time, transmitting, to the refrigerator, third information for changing the designated period.

17. The method of claim 11, wherein the first information comprises at least one of information corresponding to previous defrost operations of the refrigerator, information on humidity of an environment outside of the refrigerator, information on an external temperature of the environment outside of the refrigerator, information on an internal temperature of the refrigerator, or information on an amount of time that a door of the refrigerator is open.

18. A non-transitory computer readable storage medium storing one or more programs, the one or more programs comprising instructions, which, when being executed by at least one processor of an electronic device, cause the electronic device to:

receive, from a refrigerator connected with the electronic device through a network, first information on the refrigerator, input, as input data, at least a portion of the first information to a prediction model for managing a defrosting period of the refrigerator, obtain a defrosting time, which is a time for removing a frost formed around an evaporator of the refrigerator, as output data from the prediction model in response to the input data, determine, based on the defrosting time, a frost level of a plurality of frost levels for setting the defrosting period of the refrigerator, and transmit second information comprising the determined frost level, wherein the second information causes the refrigerator to:

set the defrosting period of the refrigerator and adjust a temperature around the evaporator of the refrigerator.

* * * * *